(12) United States Patent
Rolly

(10) Patent No.: US 7,033,423 B2
(45) Date of Patent: *Apr. 25, 2006

(54) GRAY INKS FOR INK-JET PRINTING

(75) Inventor: Luanne J. Rolly, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 206 days.

This patent is subject to a terminal disclaimer.

(21) Appl. No.: 10/428,298

(22) Filed: Apr. 30, 2003

(65) Prior Publication Data

US 2004/0216638 A1 Nov. 4, 2004

(51) Int. Cl.
C09D 11/02 (2006.01)

(52) U.S. Cl. .............. 106/31.13; 106/31.27; 106/31.58; 106/31.6; 106/31.86

(58) Field of Classification Search ............ 106/31.13, 106/31.27, 31.58, 31.6, 31.86; 347/100
See application file for complete search history.

(56) References Cited

U.S. PATENT DOCUMENTS

| | | | |
|---|---|---|---|
| 4,180,407 A | 12/1979 | Gibson et al. | |
| 5,461,405 A | 10/1995 | Lehmann et al. | |
| 5,803,958 A * | 9/1998 | Katsen et al. ............ | 106/31.65 |
| 5,821,956 A | 10/1998 | Kroon et al. | |
| 5,851,273 A | 12/1998 | Morris et al. | |
| 5,858,075 A * | 1/1999 | Deardurff et al. ........ | 106/31.27 |
| 5,897,669 A | 4/1999 | Matsui | |
| 5,948,843 A | 9/1999 | Boutier et al. | |
| 5,975,671 A | 11/1999 | Spaulding et al. | |
| 5,982,992 A | 11/1999 | Waldron | |
| 6,014,226 A | 1/2000 | Harrington et al. | |
| 6,089,691 A | 7/2000 | Kakutani | |
| 6,135,655 A | 10/2000 | Magirl | |
| 6,264,300 B1 | 7/2001 | Warner | |
| 6,342,096 B1 * | 1/2002 | Kurabayashi ............ | 106/31.27 |
| 6,378,974 B1 | 4/2002 | Oelbrandt et al. | |
| 6,459,501 B1 | 10/2002 | Holmes | |
| 6,462,836 B1 | 10/2002 | Sato et al. | |
| 6,503,308 B1 * | 1/2003 | Stramel et al. .......... | 106/31.27 |
| 6,726,758 B1 * | 4/2004 | Sano ........................ | 106/31.6 |
| 6,846,353 B1 * | 1/2005 | Sano et al. ................ | 106/31.6 |
| 2002/0121219 A1 * | 9/2002 | Stramel et al. .......... | 106/31.27 |
| 2003/0056687 A1 | 3/2003 | Sano | |
| 2004/0035320 A1 | 2/2004 | Sano et al. | |
| 2004/0250726 A1 * | 12/2004 | Mott et al. ................ | 106/31.27 |

OTHER PUBLICATIONS

"Lyson Small Gamut B&W Inks"; Product Preview; Images and Text by: Jeff Dorgay; Studio Photography & Design; Apr. 2003; 1 pg.

* cited by examiner

*Primary Examiner*—Helene Klemanski

(57) ABSTRACT

A gray ink for ink-jet printing, comprising an ink vehicle; and at least one black dye selected from the group consisting of pacified Reactive Black 31, Formula I, and Direct Blue 199 TMA; and at least one yellow dye selected from the group consisting of AY23, Y104 and Y1189. Magenta and cyan dyes can also be used with the black and yellow dyes in the gray ink.

119 Claims, 1 Drawing Sheet

GRAY INKS FOR INK-JET PRINTING

FIELD OF THE INVENTION

The present invention relates to gray inks for ink-jet printing. The gray inks printed as a set are a light gray ink, a medium gray ink and a dark gray ink which are obtained by mixing a black colorant, with appropriate colorants to obtain a neutral greyscale ramp when printed.

BACKGROUND OF THE INVENTION

The benefits of using different tones of gray to create a base for ink-jet printed color images are known. By the same token, in order to create inkjet printed black and white (grayscale) images, several different tones of gray ink are needed. Such gray inks are usually created one of two ways. They can be created by diluting black ink which results in hue shifts upon dilution. On media, gray can also be obtained by mapping other colors (magenta, cyan, yellow) to get the desired hue. Such mapping of other colored inks usually results in a high ink flux on the media which results in loss of detail in dark areas. In 3-ink systems these inks require a high dye load for adequate chroma, which results in high grain due to first-drop visibility. Additionally, prints made with colored inks to map out neutral and gray areas of a print are subject to degradation due to humidity, or a lack of humidfastness, because dyes migrate in media at different rates, and the neutral or gray areas of an image will take on the hue of the dye or dyes that migrate the farthest. In 2-pen 6-ink printing using CMYcmk, images can take on the hue of the inks in the pen with the lighter drop weight.

These defects are predominant in gray and neutral areas of an image. These multi-dye inks cause the greyscale to be unbalanced resulting in color-shifted images.

SUMMARY OF THE INVENTION

The present invention relates to a gray ink for ink-jet printing, comprising: at least one of a light gray ink, a medium gray ink, and a dark gray ink; and wherein the light gray ink has a hue range of 250°–310°, a chroma range of less than 6, and an L* range of 54–72; the medium gray ink has a hue range of 250°–310°, a chroma range of less than 6, and an L* range of 30–47; and the dark gray ink has a hue range of 150°–270°, a chroma range of less than 6, and an L* range of 10–18; and when two or three of the light gray, medium gray and dark gray inks are printed together, a gray color results having a hue range of 250°–310° and a chroma range of 2–6.

In addition, the present invention relates to an ink set for ink-jet printing, comprising:

a three-ink ink set of light gray ink, medium gray ink, and dark gray ink (gGz); and wherein the light gray ink has a hue range of 250°–310°, a chroma range of less than 6, and an L* range of 60–68; the medium gray ink has a hue range of 250°–310°, a chroma range of less than 6, and an L* range of 35–42; and the dark gray ink has a hue range of 150°–270°, a chroma range of less than 6, and an L* range of 10–18; and when two or three of the light gray, medium gray and dark gray inks are printed together, a gray color results having a hue range of 250°–310° and a chroma range of 2–6.

Also, the present invention relates to an ink set for ink-jet printing, comprising a six-ink ink set of cyan ink, magenta ink, yellow ink, light gray ink, medium gray ink and dark gray ink (CMYgGz);

wherein the light gray ink has a hue range of 250°–310°, a chroma range of less than 6, and an L* range of 54–72; the medium gray ink has a hue range of 250°–310°, a chroma range of less than 6, and an L* range of 30–47; and the dark gray ink has a hue range of 150°–270°, a chroma range of less than 6, and an L* range of 10–18; and when two or three of the light gray, medium gray and dark gray inks are printed together, a gray color results having a hue range of 250°–310° and a chroma range of 2–6.

The present invention also relates to an ink set for ink-jet printing, comprising an eight-ink ink set of cyan ink, magenta ink, yellow ink, light cyan ink, light magenta ink, light gray ink, medium gray ink and dark gray ink (CMYcmgGz); wherein the light gray ink has a hue range of 250°–310°, a chroma range of less than 6, and an L* range of 60–68; the medium gray ink has a hue range of 250°–310°, a chroma range of less than 6, and an L* range of 35–42; and the dark gray ink has a hue range of 150°–270°, a chroma range of less than 6, and an L* range of 10–18; and when two or three of the light gray, medium gray and dark gray inks are printed together, a gray color results having a hue range of 250°–310° and a chroma range of 2–6.

In addition, the present invention relates to a method of printing gray and neutral areas with increased definition and decreased hue shift in 3-ink ink-jet printing comprising:

printing on a medium with a three-ink ink set of light gray ink, medium gray ink, and dark gray ink (gGz);

wherein the light gray ink has a hue range of 250°–310°, a chroma range of less than 6, and an L* range of 54–72; the medium gray ink has a hue range of 250°–310°, a chroma range of less than 6, and an L* range of 30–47; and the dark gray ink has a hue range of 150°–270°, a chroma range of less than 6, and an L* range of 10–18; and when two or three of the light gray, medium gray and dark gray inks are printed together, a gray color results having a hue range of 250°–310° and a chroma range of 2–6.

Additionally, the present invention relates to a method of printing gray and neutral areas with increased definition and decreased hue shift in 6-ink ink-jet printing comprising:

printing on a medium with a six-ink ink set of cyan ink, magenta ink, yellow ink, light gray ink, medium gray ink, and dark gray ink (CMYgGz);

wherein the light gray ink has a hue range of 250°–310°, a chroma range of less than 6, and an L* range of 60–68; the medium gray ink has a hue range of 250°–310°, a chroma range of less than 6, and an L* range of 35–42; and the dark gray ink has a hue range of 150°–270°, a chroma range of less than 6, and an L* range of 10–18; and when two or three of the light gray, medium gray and dark gray inks are printed together, a gray color results having a hue range of 250°–310° and a chroma range of 2–6.

Also, the present invention relates to a method of printing gray and neutral areas with increased definition and decreased hue shift in 8-ink ink-jet printing comprising:

printing on a medium with a eight-ink ink set of cyan ink, magenta ink, yellow ink, light cyan ink, light magenta ink, light gray ink, medium gray ink, and dark gray ink (CMYcmgGz);

wherein the light gray ink has a hue range of 250°–310°, a chroma range of less than 6, and an L* range of 54–72; the medium gray ink has a hue range of 250°–310°, a chroma range of less than 6, and an L* range of 30–47; and the dark gray ink has a hue range of 150°–270°, a chroma range of less than 6, and an L* range of 10–18; and when two or three of the light gray, medium gray and dark gray inks are printed together, a gray color results having a hue range of 250°–310° and a chroma range of 2–6.

DETAILED DESCRIPTION OF EMBODIMENTS OF THE INVENTION

Figure 1:
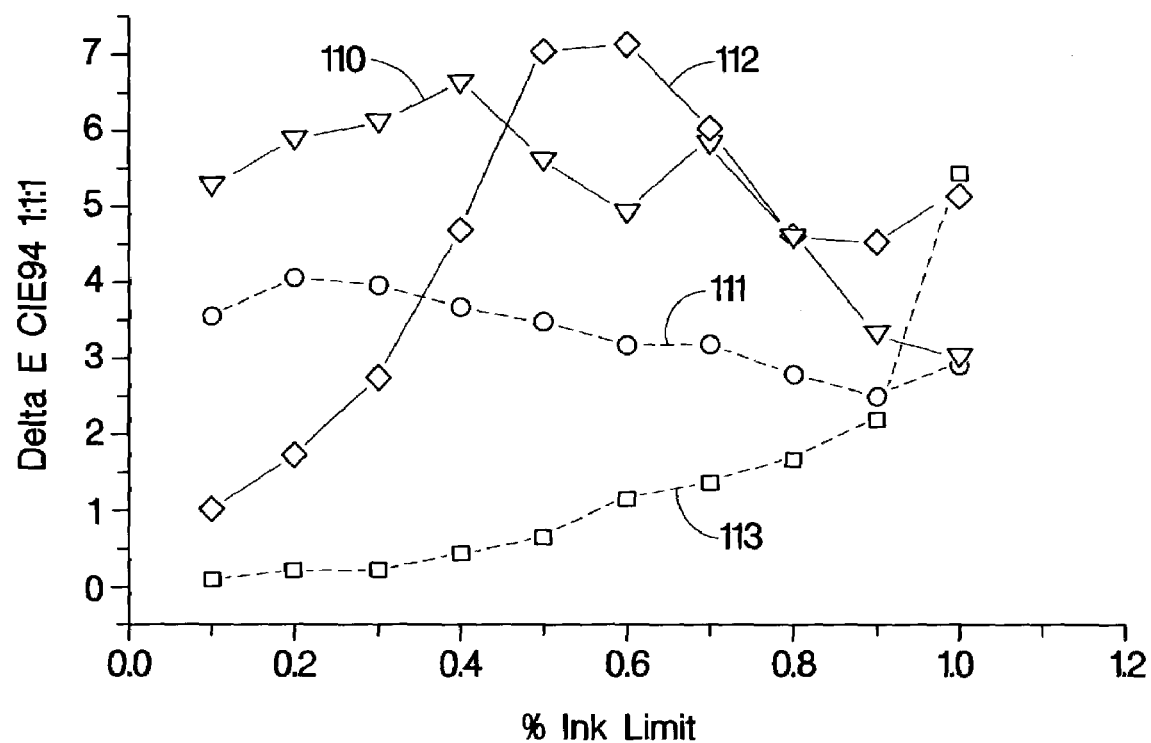
FIG. 1 is the result of testing humid-hue shift in both CmpK and Skin Tones printed in 6-ink and 8-ink format with the gray ink combination of the present invention. Delta E CIE94 1:1:1 is plotted on the Y axis vs. % ink limit on the X axis.

The present invention relates to gray ink-jet inks, specifically a set of three gray inks, which when used alone or in combination with conventional cyan, magenta and yellow (CMY), are neutral over a wide media range and illumination type. These inks can be used in 3-ink gray-scale (black & white) printing, 6-ink printing, and 8-ink printing systems. They provide excellent lightfastness and humidfastness over black and white prints made from 3-ink composite black. They can be printed alone, with CMY inks to make an alternate 6-ink system, and as part of an 8-ink printing system that uses cyan (C), magenta (M), yellow (Y), light cyan (c), light magenta (m), light gray (g), medium gray (G) and dark gray (z). (Dark gray is not a stand alone ink but only printed on media in conjunction with the light and medium gray of the present invention.)

When printing black and white with a 3 ink system (CMY) dark areas require a lot of ink, flooding the media with resulting loss of detail, particularly in shadowed areas. These gray inks (light gray, medium gray and dark gray) are able to print a black and white/gray scale with outstanding definition and clarity, because less ink is required to get the same image. Under humid conditions, in normal 3-ink CMY and 6-ink CMYcmk printing, humid hue shift is a problem— dye in ink drops that are placed adjacent to each other migrates, shifting the neutral and gray areas to the color of the dye that migrates fastest. For certain inks this gives a red shift to neutral and skintone areas of images. In the inks of the present invention, the dyes are intimately mixed in the ink and on the media so color shift due to dye migration under humid conditions is greatly reduced. In a typical 6-ink printing system, gray and neutral areas are a product of CMY and cmk inks. Usually multiple pens are used to deliver inks in 6-ink systems. There is often a dropweight variation between pens, and even though this is minimized, it cannot be eliminated. The result is that neutral and skintone areas of images printed using 6-ink CMYcmk are often color shifted or producing an off hue. When a pen having the inks of the current invention are used in conjunction with a typical 6-ink system to make an 8 inksystem CMYcmgGz, there are no problems with the hue shift in neutral areas. The resulting images are rendered more accurately. This is further discussed in Example 2.

In a general embodiment, the inventor has found that to obtain the ideal gray ink for skin tones and neutral areas, as discussed above, the three gray inks: the light gray, medium gray and dark gray inks of the present invention, need to be printed in combination of two or three. For such an ideal gray ink, the light ink should have a hue range of 250°–310°, a chroma range of less than 6, and an L* (the Cielab measurement unit for brightness) range of 60–68; the medium gray ink should have a hue range of 250°–310°, a chroma range of less than 6, and an L* range of 35–42; and the dark gray ink should have a hue range of 150°–270°, a chroma range of less than 6, and an L* range of 10–18. When two or three of the light gray, medium gray and dark gray inks are printed together, a gray color results which has a hue range of 250°–310° and a chroma range of 2–6. In preferred embodiment, the medium gray ink comprises a black colorant having a hue range of 250°–270°; and a yellow colorant having a hue range of 80°–120°. In a more preferred embodiment, the medium gray further comprises a magenta colorant having a hue range of 320°–350°. In another more preferred embodiment, the medium gray ink further comprises a magenta colorant having a hue range of 320°–350°. In yet another more preferred embodiment, the medium gray ink further comprises a cyan colorant having a hue range of 215°–240°.

Gray inks of the present invention can be obtained by blending combinations of black with other colorants. Preferred embodiments of these combinations can use, but are not limited to, the following inks:

One preferred embodiment black can include a black metallized bisazo dye having the following general formula, Formula I:

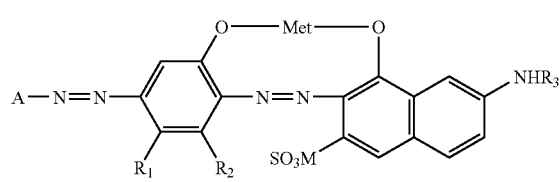

Formula I

In Formula 1, A is unsubstituted or optionally substituted phenyl or unsubstituted or optionally substituted naphthyl; $R_1$ is hydrogen, alkyl, optionally substituted alkyl, alkoxy, optionally substituted alkoxy, all with 1 to 18 C atoms, amino, optionally substituted amino, halo, trifluoromethyl, carboxy, sulpho, carbamido, alkylcarbonylamino, arylcarbonylamino; or forms together with $R_2$ and the phenylene ring a 1,4-naphthylene moiety, which can be unsubstituted or substituted in position 6 or 7; $R_3$ is hydrogen, alkyl, optionally substituted alkyl, all with 1 to 18 C atoms, cycloalkyl, unsubstituted or optionally substituted heterocyclic alkyl, unsubstituted or optionally substituted aryl, unsubstituted or optionally substituted aralkyl, saturated and unsaturated aza and/or oxa and/or thia heterocyclic radicals; M is hydrogen, a metal cation, preferentially an alkali metal cation, an ammonium cation or an ammonium cation substituted with alkyl, alkoxyalkyl or hydroxyalkyl radicals each having 1 to 12 C atoms; and Met is Cu, Ni or Zn.

Another preferred embodiment black can be pRB31 (pacified form of Reactive Black 31) having the general formula

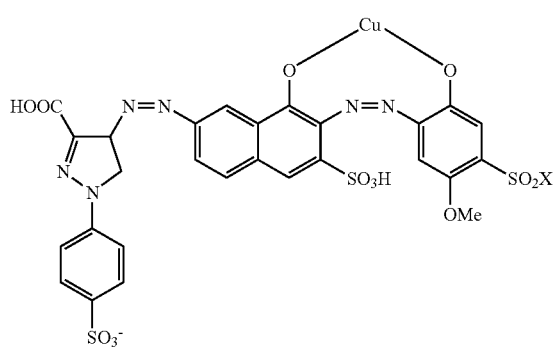

and being available as Remazol Black R-KRL from Hoescht Chemical Company).

In RB31, X is $CH_2CH_2OH$, or $CH_2$—$CH_2$=$CH_2$, or a mixture thereof, and Me represents $CH_3$. When X is $CH_2CH_2OH$, the composition is known as the "ethyl hydroxyl form," or "hydroxyl form," which may be used interchangeably. When X is $CH_2$—$CH_2$=$CH_2$, the composition is known as the "vinyl sulfone form," or "vinyl form" which may be used interchangeably. Additionally, salt and other derivative forms such as sodium salts, lithium salts, trimethylamine (TMA) salts, potassium salts, and the like may be used.

Preferred embodiments yellows can include: AY23 (Acid Yellow 23)(5-Oxo-1-(p-sulfophenyl)-4-[p-sulfophenyl)azo]-2-pyrazoline-3-carboxylic acid, trisodium salt)

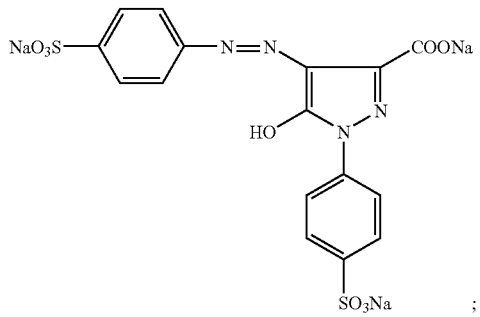

Y104 (Sulfonated azo dye, Ilford AG)

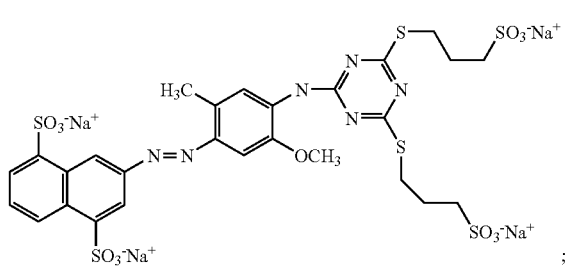

and Y1189 (1,3-naphthalenedisulphonic acid, 7-((4-((4,6-bis-((3-sulfoprop-1-yl)thio)-1,3,5-triazin-2-yl)amino)-3-methoxyphenyl)azo)tetrasodium salt, Ilford Imaging AG)

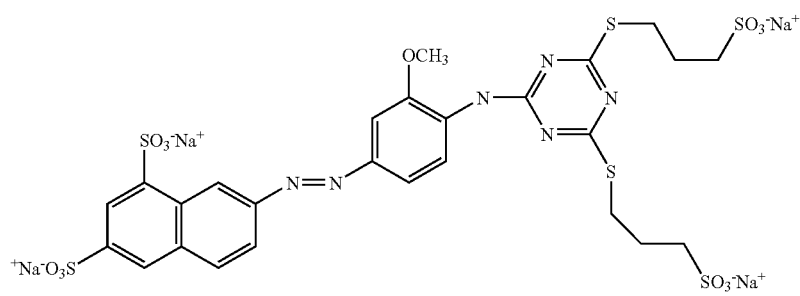

Preferred embodiment magentas include DJR814

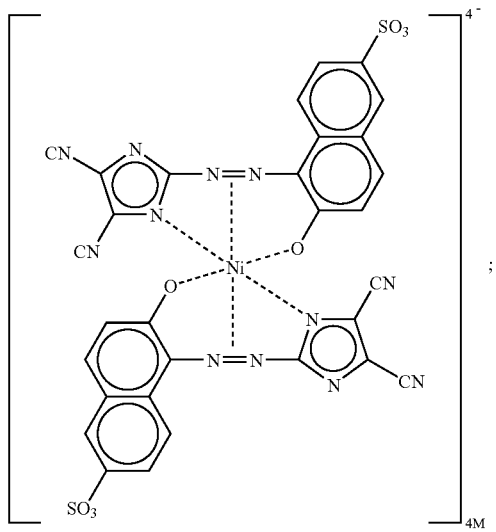

and Formula II

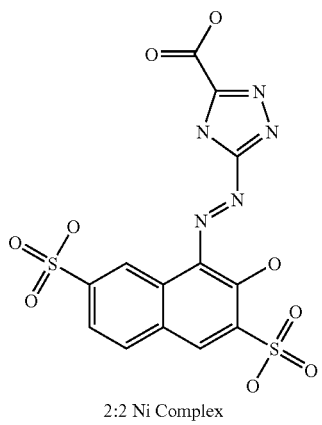

2:2 Ni Complex

Preferred cyan dyes are derivatives of copper pthalocyanine (below), wherein each R group of the copper phthalocyanine can independently be H or a functional group including $SO_3H$, $SO_2NH_2$ or $SO_2NH$-lower alkyl-OH:

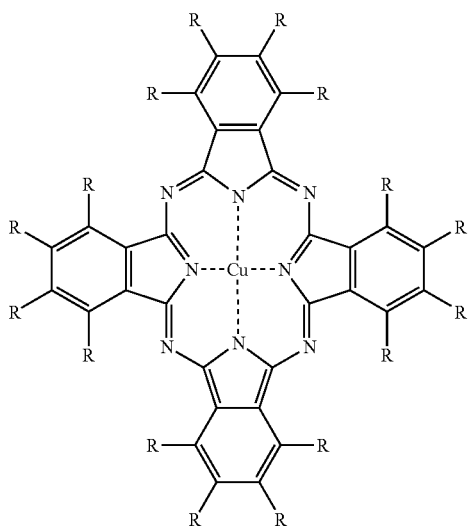

Preferred embodiment cyans can include:

C854 (also called C485/4 and S175485/4, Avecia Ltd.)

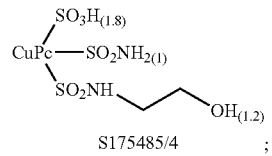

S175485/4

DB199TMA (Direct Blue 199, copper phthalocyanine derivative with trimethylamine)(CI Index Number 74180), and C485 (also called S175485, Avecia Ltd.)

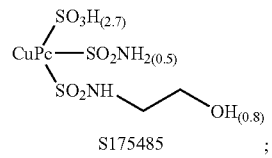

S175485

Preferred embodiment combinations of these dyes can include:

a) AY23, Formula I, DJR814 and C854;
b) Y104, pRB31 and K1334;
c) Y104, K1334, DJR814 and DB199TMA;
d) Y104, K1334, DJR814 and C485;
e) Y104, K1334, DJR814 and C854;
f) Y1189, Formula I, DJR814 and C854;
g) Y104, K1334 and Formula II;
h) Y1189, K1334 and DJR814; and
i) Y104, K1334 and DJR814.

Light gray ink of the combination Y104, pRB31 and K1334 has a preferred absorbance ratio of the separate dyes of 1:6:8, with each specified value ranging +/−10%. Dark gray ink of the combination Y104, pRB31 and K1334 has a preferred absorbance ratio of the separate dyes of 1:4:8, with each specified value ranging +/−10%.

Light gray ink of the combination Y104, Formula I, DJR814 and DB199TMA has a preferred absorbance ratio of the separate dyes of 1.4:1.4:1:1, with each specified value ranging +/−10%.

Light gray ink of the combination Y104, Formula I, DJR814 and C485 has a preferred absorbance ratio of the separate dyes of 1.4:1.4:1:1, with each specified value ranging +/−10%.

Light gray ink of the combination Y104, Formula I, DJR814 and C854 has a preferred absorbance ratio of the separate dyes of 1.4:1.8:1:1 with each specified value ranging +/−10%.

Light gray ink of the combination Y1189, Formula I, DJR814 and C854 has a preferred absorbance ratio of the separate dyes of 1.6:1.8:1:1 with each specified value ranging +/−10%.

Light gray ink of the combination Y104, Formula I, and DJR814 has a preferred absorbance ratio of the separate dyes of 2:4.9:1 with each specified value ranging +/−10%. Dark gray ink of the combination Y104, Formula I and DJR814 has a preferred absorbance ratio of the separate dyes of 2.7:6.5:1 with each specified value ranging +/−10%.

Also for the combination of Formula I, Y104 and DJR814, a non-limiting example using weight percents in ink of these dyes is given for light gray (g), medium gray(G) and dark gray (z). For light gray ink the weight percentage ranges are 0.39–0.48% Formula I; 0.14–0.17% Y104; 0.44–0.54% DJR814. For medium gray ink, the weight percentage ranges are 1.13–1.39% Formula I; 0.39–0.48% Y104; 0.13–0.16% DJR814. For dark gray ink, the weight percentages are 4.5–9.0% Formula I; 1.8–3.6% Y104; and 0.4–0.9% DJR814.

The ratios of the dyes for each of the blends is particular to that blend series. Some give better lightfastness or humidfastness than others. Some of the dye blends are neutral on swellable media (Media 1) but not as neutral on porous $Al_2O_3$ coated media (Media 2). The preferred blend has excellent lightfastness on Media 1 and Media 2, very good neutral color on both media, as well as on a large selection of other media, and retains the neutral color under several different lighting conditions.

Overall, the advantages obtained with use of the present invention are: improved grayscale, improved black and white inkjet images, improved humidfastness over 3-ink (CMY, cyan/magenta/yellow), improved 6-ink (CMYcmk, cyan/magenta/yellow/light cyan/light magenta/black). Specifically, 6-ink CMYgGz gives improved gamut over 6-ink CMYcmk. Also 3-ink gGz gives improved gamut over 3-ink CMY printing. Finally 8-ink CMY cmgGz gives inkjet prints with exceptional clarity, depth of image, gamut, lightfastness, detail in shadow areas, and improved humidfastness.

A typical formulation for an ink vehicle useful in the practice of this invention can include three co-solvents. Such co-solvents include 1,5-pentanediol present at from 1% to 3% by weight, trimethylolpropane at from 7.5% to 15% by weight, and a third co-solvent present at from 5% to 8% by weight, with the proviso that the total co-solvent weight ratio is greater than 20% by weight. In this embodiment, an optional buffer consisting essentially of 2-amino-2-(hydroxymethyl)-1,3-propanediol can be present.

Alternatively, a non-reactive ink-vehicle for low dye-load ink-jet ink can comprise an effective amount of water; from 1% to 3% by weight of a 1,5-pentanediol co-solvent; from 7.5% to 15% by weight of a trimethylolpropane co-solvent; and from 0.05% to 0.25% of a buffer consisting essentially of 2-amino-2-(hydroxymethyl)-1,3-propanediol. In this embodiment, an optional third co-solvent can be present.

Classes of co-solvents that can be used as the third co-solvent can include aliphatic alcohols, aromatic alcohols, diols, glycol ethers, polyglycol ethers, pyrrolidines, pyrrolidinones, and mixtures thereof, with the proviso that no more than 10 carbons be present with respect to each third co-solvent. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, substituted and unsubstituted pyrrolidines, substituted and unsubstituted pyrrolidinones, and the like. Though there is some degree of variance that can occur with respect to the third co-solvent, the ink-vehicle formulation must include 1,5-pentanediol and trimethylolpropane. In one embodiment, a third co-solvent can preferably be 2-pyrrolidinone.

In addition to the vehicle components described above, a surfactant component can also be present, preferably a combination of a non-ionic surfactant and an anionic surfactant. The surfactant component can comprise alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of total surfactant added to the formulation of this invention can range from 1% to 5% by weight. In one embodiment, the total surfactant can include from 1% to 3% by weight of one or more non-ionic surfactant, and from 0.1% to 1% by weight of one or more anionic surfactant. In one embodiment, the nonionic surfactant can be TERGITOL 15-S-5, TERGITOL 15-S-7, or combinations thereof. In another embodiment, the anionic surfactant can be DOWFAX 8390, for example.

It is often desirable with respect to ink-jet ink formulations to have a buffer present in order help maintain a stable pH during storage as well as during operating conditions. In accordance with the present invention, some buffers can contribute to undesired properties, particularly when in the presence of a nonionic surfactant. For example, certain buffer/nonionic surfactant combinations can lower what is known as the cloud point to an extent that the nonionic surfactant will not stay in solution at room temperature (or slightly above room temperature), making the ink unsuitable for effective use. In accordance with this principle, because the ink-vehicle formulations of the present invention are specific with respect to functionality, there are many buffers used in the ink-jet ink arts that are not desirable for use. For example, 4-morpholineethanesulfonic acid (MES) and 4-morpholinepropanesulfonic acid (MOPS) are not particularly useful with the present ink vehicles, particularly when used with low dye load formulations having one or more nonionic surfactant present. However, 2-amino-2-(hydroxymethyl)-1,3-propanediol (TRIZMA) can be used in the present ink-vehicles with improved results. Preferably, if the TRIZMA buffer is used, then it can be present at from 0.05% to 0.25% by weight. As an example, an ink vehicle prepared in accordance with the present invention having a TERGITOL nonionic surfactant present, and MOPS or MES buffer present instead of TRIZMA, at 40° C., two layers can form where the nonionic surfactant actually comes out of solution. As this is not desirable for effective use in accordance with the present invention, MOPS and MES are undesirable for use when the ink-jet ink also contains a nonionic surfactant component.

The balance of the formulation can be purified water, though other known vehicle components can be included, provided they are not specifically excluded by the present disclosure. Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof. Sequestering agents such as EDTA (ethylenediaminetetraaceticacid) may be included to eliminate the deleterious effects of heavy metal impurities. From 0.001% to 2.0% by weight, for example, can be used. Viscosity modifiers may also be present, as well as other additives known to those skilled in the art to modify properties of the ink as desired. Such additives can be present at from 0.01% to 20% by weight.

EXAMPLES

Example 1

Lightfade results were obtained for the set of gray inks of the present invention printed on two different media. Gray inks containing Formula I, Y104, and DJR814 of the present invention were printed on both swellable media (Media 1) and porous $Al_2O_3$ coated media (Media 2). The printed media were then placed in fadeometers, and measured periodically. The table below shows the extrapolated years that it would take for the samples printed with the set of gray inks of the present invention to fade according to the "Wilhelm Criteria" (developed by Dr. Henry Wilhem of Wilhelm Imaging Research) based on a linear fit of data.

| Ink Set | Media | Protected/ Unprotected | Extrapolated Years at Primary Failure Mode | Extrapolated Years at Secondary Failure Mode |
|---|---|---|---|---|
| 3-ink gGz | Media 1 | Unprotected | 25 | N/A |
| 3-ink gGz | Media 1 | Protected | 85 | N/A |
| 8-ink CMYcmgGz | Media 1 | Unprotected | 24 (gGz) | 27 (Y) |
| 8-ink CMYcmgGz | Media 1 | Protected | 43 (Y) | 77 (gGz) |
| 8-ink CMYcmgGz | Media 2 | protected | 28 (gGz) | 30 (Y) |

Example 2

CmpK 6-ink (CMYcmK), CmpK 8-ink (CMYcmgGz), Skin Tones 6-ink (CMYcmK) and Skin Tones 8-ink (CMYcmgGz) were printed on HP Premium Plus Glossy Media and humid-hue shift was measured after 4 days at 35° C. 80% relative humidity. As shown in FIG. 1, Delta E CIE94 1:1:1 is plotted on the Y axis vs. % ink limit (with 1 being 100% of the ink limit) on the X axis and shown as curves 110 (Skin Tones 6-ink), 111 (Skin Tones 8-ink), 112(CmpK 6-ink), and 113(CmpK 8-ink). Delta E is a measurement of differences in color using the CIE94 method. This is a technique that models the response of human vision to light reflected from smooth surfaces. One Delta E approximates the minimum color difference a typical person can distinguish under good to ideal lighting conditions. Thus, a change below 2 units means it is difficult to perceive a color shift. The graph shows that when the gray inks of the present invention in printing neutral areas (CmpK 8-ink) and skin tones (Skin Tones 8-ink), there is a very significant improvement in humid hue shift when compared to systems that use individual cyan, magenta and yellow dots for neutral and skin tone areas.

What is claimed is:

1. An ink or set of inks for ink-jet printing, selected from the group consisting of:
   a light gray ink, a medium gray ink, a dark gray ink and combinations thereof;
   each ink comprising a black colorant and a yellow colorant;
   and wherein the light gray ink has a hue range of 250°–310°, a chroma range of less than 6, and an L* range of 54–72; the medium gray ink has a hue range of 250°–310°, a chroma range of less than 6, and an L* range of 30–47; and the dark gray ink has a hue range of 150°–270°, a chroma range of less than 6, and an L* range of 10–18; and when two or three of the light gray, medium gray and dark gray inks are printed together, a gray color results having a hue range of 250°–310° and a chroma range of 2–6.

2. The ink or set of inks of claim 1, wherein in the medium gray ink:
   the black colorant has a hue range of 250°–270°; and
   the yellow colorant has a hue range of 80°–120°.

3. The ink or set of inks of claim 2, wherein the medium gray ink further comprises an additional magenta colorant having a hue range of 320°–350°.

4. The ink set or set of inks of claim 3, wherein the medium gray ink further comprises an additional cyan colorant having a hue range of 215°–240°.

5. The ink or set of inks of claim 1, wherein the black colorant is at least one black dye selected from the group consisting of pacified Reactive Black 31 and

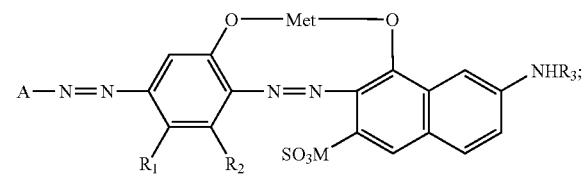

Formula I wherein A is unsubstituted or optionally substituted phenyl or unsubstituted or optionally substituted naphthyl; $R_1$ is hydrogen, alkyl, optionally substituted alkyl, alkoxy, optionally substituted alkoxy, all with 1 to 18 carbon atoms, amino, optionally substituted amino, halo, trifluoromethyl, carboxy, sulpho, carbamido, alkylcarbonylamino, arylcarbonylamino, or forms together with $R_2$ and the phenylene ring a 1,4-naphthylene moiety which can be unsubstituted or substituted in position 6 or 7; $R_3$ is hydrogen, alkyl, optionally substituted alkyl, all with 1 to 18 carbon atoms, cycloalkyl, unsubstituted or optionally substituted heterocyclic alkyl, unsubstituted or optionally substituted aryl, unsubstituted or optionally substituted aralkyl, saturated or unsaturated aza, oxa or thia heterocyclic radicals or mixtures of saturated or unsaturated aza, oxa or thia heterocyclic radicals; M is hydrogen, a metal cation, an ammonium cation or an ammonium cation substituted with alkyl, alkoxyalkyl or hydroxyalkyl radicals each having 1 to 12 carbon atoms and Met is Cu, Ni or Zn;
and wherein the yellow colorant is at least one yellow dye selected from the group consisting of AY23,

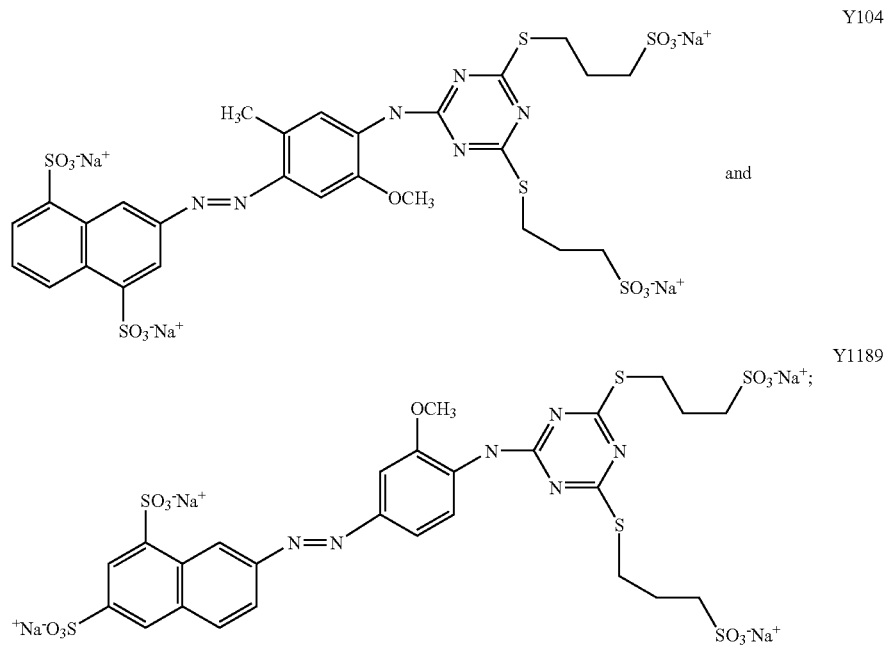
and each of the inks further comprises a magenta colorant which is at least one magenta dye selected from the group consisting of
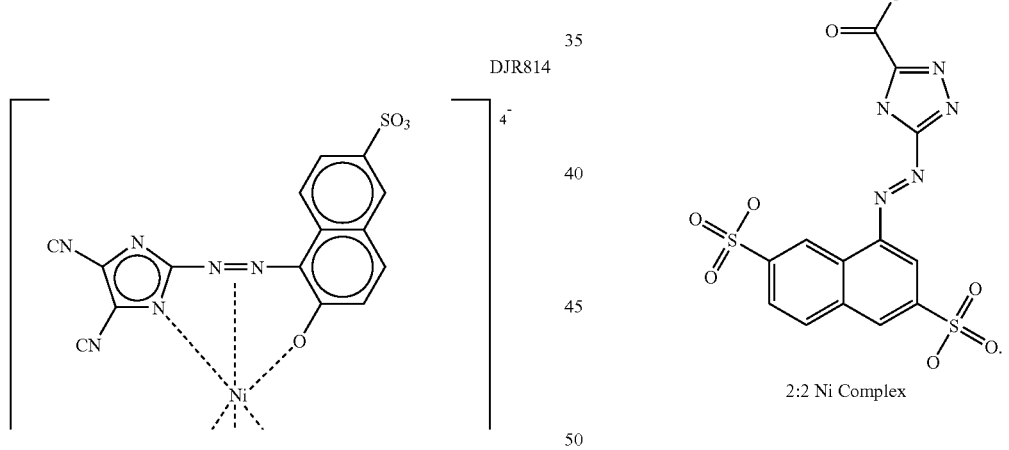
-continued
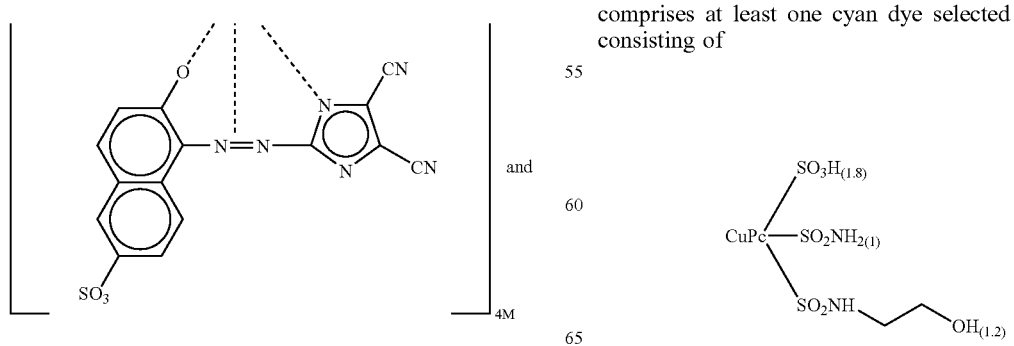
6. The ink or set of inks of claim 5, wherein the ink further comprises at least one cyan dye selected from the group consisting of -continued

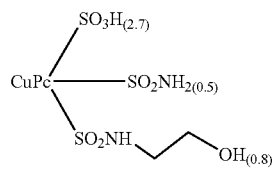
C485 and Direct Blue 199 TMA.

7. The ink or set of inks of claim 6, wherein the at least one yellow dye is Y104; the at least one black dye is Formula I; the at least one magenta dye is DJR814; and the at least one cyan dye is selected from the group consisting of DB199TMA and C485;

and wherein the absorbance ratio of yellow dye:black dye:magenta dye:cyan dye for light gray ink is 1.4:1.4:1:1 with each ratio value ranging +/−10%.

8. The ink or set of inks of claim 6, wherein the at least one yellow dye is Y104; the at least one black dye is Formula I; the at least one magenta dye is DJR814; and the at least one cyan dye is C854;

and wherein the absorbance ratio of yellow dye:black dye:magenta dye:cyan dye for light gray ink is 1.4:1.8:1:1 with each ratio value ranging +/−10%.

9. The ink or set of inks of claim 6, wherein the at least one yellow dye is Y1189; the at least one black dye is Formula I; the at least one magenta dye is DJR814; and the at least one cyan dye is C854;

and wherein the absorbance ratio of yellow dye:black dye:magenta dye:cyan dye for light gray ink is 1.6:1.8:1:1 with each ratio value ranging +/−10%.

10. The ink or set of inks of claim 6, wherein the at least one black dye is Formula I; the at least one yellow dye is AY23; the at least one magenta dye is DJR814; and the at least one cyan dye is C854.

11. The ink or set of inks of claim 5, wherein the at least one yellow dye is Y104; the at least one black dye is Formula I; and the at least one magenta dye is DJR814; and wherein the absorbance ratio of yellow dye:black dye:magenta dye for light gray ink is about 2:4.9:1 with each ratio value ranging +/−10%.

12. The ink or set of inks of claim 5, wherein the at least one yellow dye is Y104; the at least one black dye is Formula I; and the at least one magenta dye is DJR814; and wherein the absorbance ratio of yellow dye:black dye:magenta dye for dark gray ink is 2.7:6.5:1 with each ratio value ranging +/−10%.

13. The ink or set of inks of claim 5, wherein the at least one black dye is Formula I; the at least one yellow dye is Y104; and the at least one magenta dye is Formula II.

14. The ink or set of inks of claim 5, wherein the ink vehicle is a non-reactive ink-vehicle comprising:

water;
from 1% to 3% by weight of 1,5-pentanediol co-solvent;
from 7.5% to 15% by weight of trimethylolpropane co-solvent; and
from 5% to 8% by weight of a third co-solvent, with the proviso that the ink vehicle comprise at least 20% by weight of total co-solvents.

15. The ink or set of inks of claim 1, comprising:
an ink vehicle; and
pacified Reactive Black 31;

Formula I

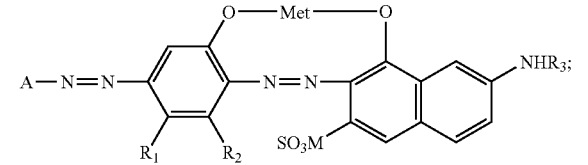

wherein A is unsubstituted or optionally substituted phenyl or unsubstituted or optionally substituted naphthyl; $R_1$ is hydrogen, alkyl, optionally substituted alkyl, alkoxy, optionally substituted alkoxy, all with 1 to 18 carbon atoms, amino, optionally substituted amino, halo, trifluoromethyl, carboxy, sulpho, carbamido, alkylcarbonylamino, arylcarbonylamino, or forms together with $R_2$ and the phenylene ring a 1,4-naphthylene moiety which can be unsubstituted or substituted in position 6 or 7; $R_3$ is hydrogen, alkyl, optionally substituted alkyl, all with 1 to 18 carbon atoms, cycloalkyl, unsubstituted or optionally substituted heterocyclic alkyl, unsubstituted or optionally substituted aryl, unsubstituted or optionally substituted aralkyl, saturated or unsaturated aza, oxa or thia heterocyclic radicals or mixtures of saturated or unsaturated aza, oxa or thia heterocyclic radicals; M is hydrogen, a metal cation, an ammonium cation or an ammonium cation substituted with alkyl, alkoxyalkyl or hydroxyalkyl radicals each having 1 to 12 carbon atoms and Met is Cu, Ni or Zn;

and at least one yellow dye selected from the group consisting of AY23,

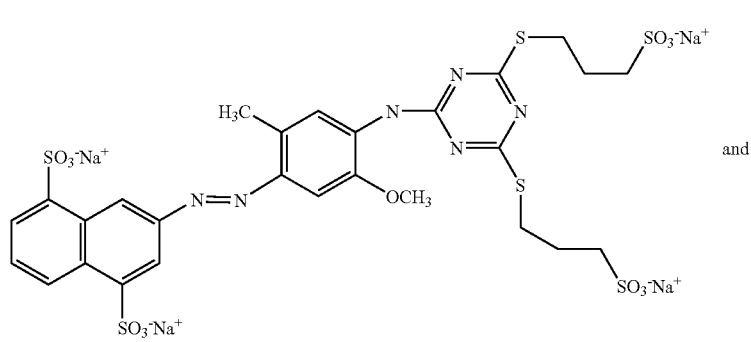

Y104 and

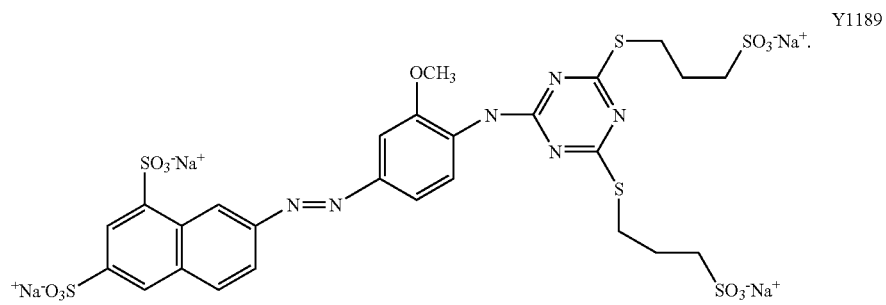

Y1189

16. The ink or set of inks of claim 15, wherein the at least one yellow dye is Y104; and wherein the absorbance ratio of Y104 dye:pacified Reactive Black 31 dye:Formula I dye for light gray ink is 1:6:8 with each ratio value ranging +/−10%.

17. The ink or set of inks of claim 15, wherein the at least one yellow dye is Y104; and wherein the absorbance ratio of Y104 dye:pacified Reactive Black 31 dye:Formula I dye for dark gray ink is 1:4:8 with each ratio value ranging +/−10%.

18. An ink set for ink-jet printing, comprising:
a three-ink ink set of light gray ink, medium gray ink, and dark gray ink (gGz), each of the inks comprising a black colorant and a yellow colorant;
and wherein the light gray ink has a hue range of 250°–310°, a chroma range of less than 6, and an L* range of 60–68; the medium gray ink has a hue range of 250°–310°, a chroma range of less than 6, and an L* range of 35–42; and the dark gray ink has a hue range of 150°–270°, a chroma range of less than 6, and an L* range of 10–18; and when two or three of the light gray, medium gray and dark gray inks are printed together, a gray color results having a hue range of 250°–310° and a chroma range of 2–6.

19. The ink set of claim 18, wherein in the medium gray ink:
the black colorant has a hue range of 250°–270°; and
the yellow colorant has a hue range of 80°–120°.

20. The ink set of claim 19, wherein the medium gray ink further comprises an additional magenta colorant having a hue range of 320°–350°.

21. The ink set of claim 20, wherein the medium gray ink further comprises an additional cyan colorant having a hue range of 215°–240°.

22. The ink set of claim 18, wherein the black colorant is at least one black dye selected from the group consisting of pacified Reactive Black 31 and Formula I

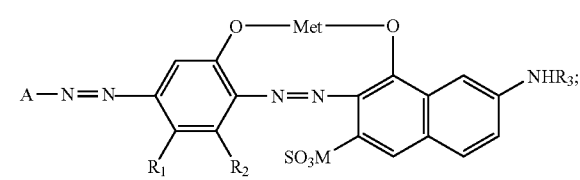

wherein A is unsubstituted or optionally substituted phenyl or unsubstituted or optionally substituted naphthyl; $R_1$ is hydrogen, alkyl, optionally substituted alkyl, alkoxy, optionally substituted alkoxy, all with 1 to 18 carbon atoms, amino, optionally substituted amino, halo, trifluoromethyl, carboxy, sulpho, carbamido, alkylcarbonylamino, arylcarbonylamino, or forms together with $R_2$ and the phenylene ring a 1,4-naphthylene moiety which can be unsubstituted or substituted in position 6 or 7; $R_3$ is hydrogen, alkyl, optionally substituted alkyl, all with 1 to 18 carbon atoms, cycloalkyl, unsubstituted or optionally substituted heterocyclic alkyl, unsubstituted or optionally substituted aryl, unsubstituted or optionally substituted aralkyl, saturated or unsaturated aza, oxa or thia heterocyclic radicals or mixtures of saturated or unsaturated aza, oxa or thia heterocyclic radicals; M is hydrogen, a metal cation, an ammonium cation or an ammonium cation substituted with alkyl, alkoxyalkyl or hydroxyalkyl radicals each having 1 to 12 carbon atoms and Met is Cu, Ni or Zn;

and wherein the yellow colorant is at least one yellow dye selected from the group consisting of AY23,

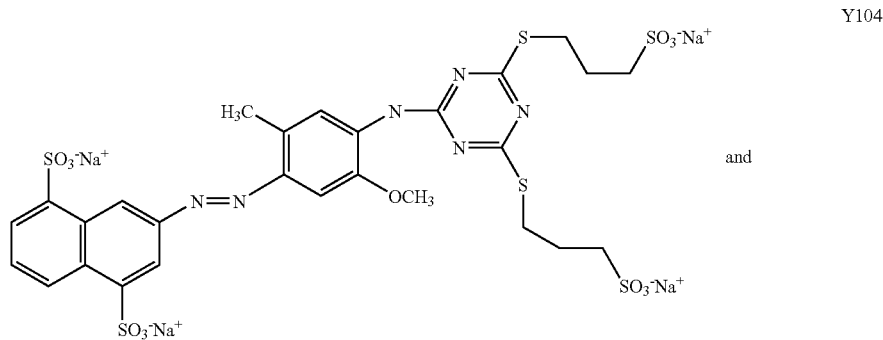

Y104 and

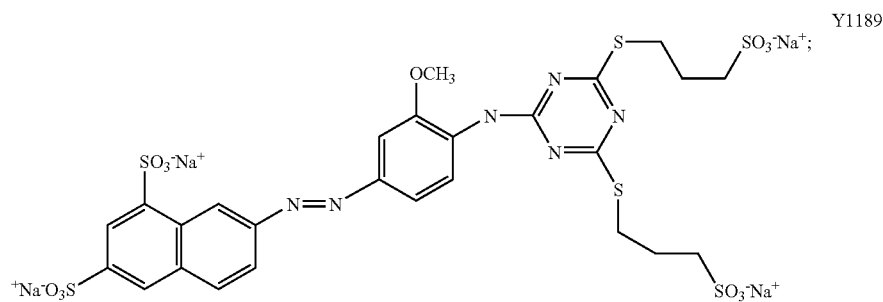

Y1189 and the light gray ink, medium gray ink and dark gray ink each further comprises a magenta colorant which is at least one magenta dye selected from the group consisting of

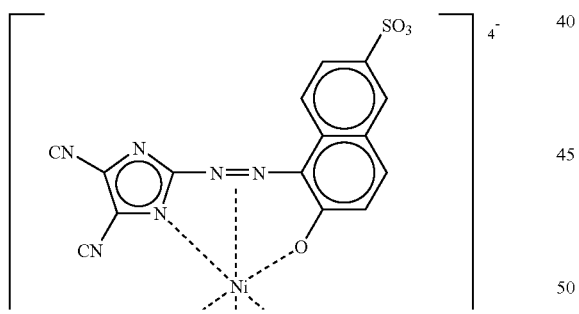

DJR814 and

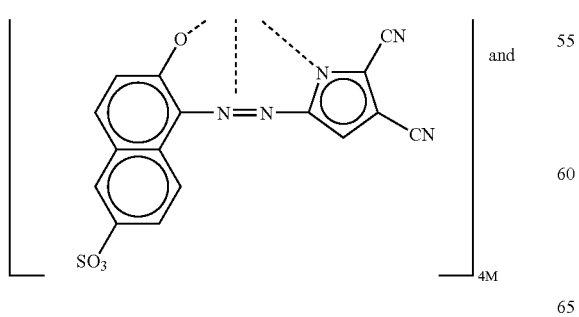

-continued

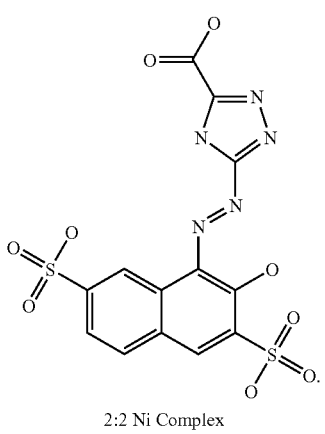

Formula II

2:2 Ni Complex

23. The ink set of claim 22, wherein the light gray ink, medium gray ink and dark gray ink each further comprises a cyan colorant which is at least one cyan dye selected from the group consisting of

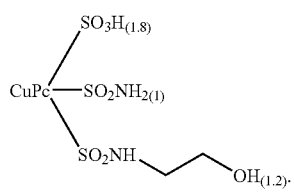

C854

-continued

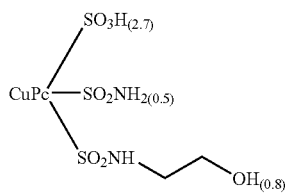

C485 and Direct Blue 199 TMA.

24. The ink set of claim 23, wherein the at least one yellow dye is Y104; the at least one black dye is Formula I; the at least one magenta dye is DJR814; and the at least one cyan dye is selected from the group consisting of DB199TMA and C485;
and wherein the absorbance ratio of yellow dye:black dye:magenta dye:cyan dye for light gray ink is 1.4:1.4:1:1 with each ratio value ranging +/−10%.

25. The ink set of claim 23,
wherein the at least one yellow dye is Y104; the at least one black dye is Formula I; the at least one magenta dye is DJR814; and the at least one cyan dye is C854;
and wherein the absorbance ratio of yellow dye:black dye:magenta dye:cyan dye for light gray ink is 1.4:1.8:1:1 with each ratio value ranging +/−10%.

26. The ink set of claim 23,
wherein the at least one yellow dye is Y1189; the at least one black dye is Formula I; the at least one magenta dye is DJR814; and the at least one cyan dye is C854;
and wherein the absorbance ratio of yellow dye:black dye:magenta dye:cyan dye for light gray ink is 1.6:1.8:1:1 with each ratio value ranging +/−10%.

27. The ink set of claim 23, wherein the at least one black dye is Formula I; the at least one yellow dye is AY23; the at least one magenta dye is DJR814; and the at least one cyan dye is C854.

28. The ink set of claim 22,
wherein the at least one yellow dye is Y104; the at least one black dye is Formula I; and the at least one magenta dye is DJR814; and wherein the absorbance ratio of yellow dye:black dye:magenta dye for light gray ink is about 2:4.9:1 with each ratio value ranging +/−10%.

29. The ink set of claim 22, wherein the at least one yellow dye is Y104; the at least one black dye is Formula I; and the at least one magenta dye is DJR814; and wherein the absorbance ratio of yellow dye:black dye:magenta dye for dark gray ink is 2.7:6.5:1 with each ratio value ranging +/−10%.

30. The ink set of claim 22, wherein the at least one black dye is Formula I; the at least one yellow dye is Y104; and the at least one magenta dye is Formula II.

31. The ink set of claim 22, wherein the ink vehicle is a non-reactive ink-vehicle comprising:
water;
from 1% to 3% by weight of 1,5-pentanediol co-solvent;
from 7.5% to 15% by weight of trimethylolpropane co-solvent; and
from 5% to 8% by weight of a third co-solvent, with the proviso that the ink vehicle comprise at least 20% by weight of total co-solvents.

32. The ink set of claim 18, wherein the

Formula I

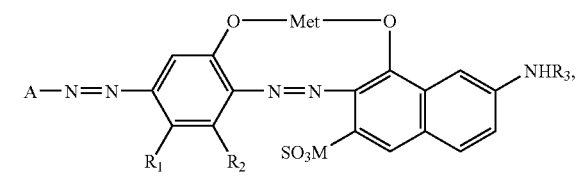

and pacified Reactive Black 31; and wherein the yellow colorant is at least one yellow dye selected from the group consisting of AY23,

Y104

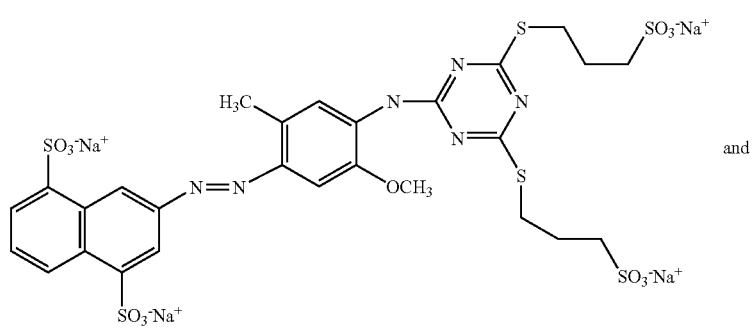

and

-continued

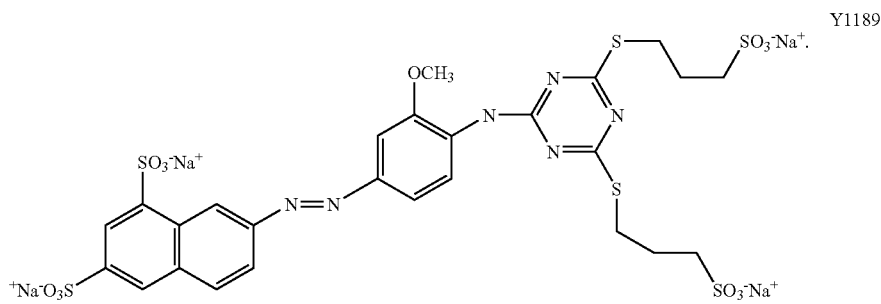

33. The ink-set of claim 32, wherein the at least one yellow dye is Y104; and wherein the absorbance ratio of Y104 dye:pacified Reactive Black 31 dye:Formula I dye for light gray ink is 1:6:8 with each ratio value ranging +/−10%.

34. The ink-set of claim 32, wherein the at least one yellow dye is Y104; and wherein the absorbance ratio of Y104 dye:pacified Reactive Black 31 dye:Formula I dye for dark gray ink is 1:4:8 with each ratio value ranging +/−10%.

35. An ink set for ink-jet printing, comprising a six-ink ink set of cyan ink, magenta ink, yellow ink, light gray ink, medium gray ink and dark gray ink (CMYgGz); the light gray ink, medium gray ink and dark gray ink each comprising a black colorant and a yellow colorant;
and wherein the light gray ink has a hue range of 250°–310°, a chroma range of less than 6, and an L* range of 54–72; the medium gray ink has a hue range of 250°–310°, a chroma range of less than 6, and an L* range of 30–47; and the dark gray ink has a hue range of 150°–270°, a chroma range of less than 6, and an L* range of 10–18; and when two or three of the light gray, medium gray and dark gray inks are printed together, a gray color results having a hue range of 250°–310° and a chroma range of 2–6.

36. The ink set of claim 35, wherein in the medium gray ink:
the black colorant has a hue range of 250°–270°; and
the yellow colorant has a hue range of 80°–120°.

37. The ink set of claim 36, wherein the medium gray ink further comprises an additional magenta colorant having a hue range of 320°–350°.

38. The ink set of claim 37, wherein the medium gray ink further comprises an additional cyan colorant having a hue range of 215°–240°.

39. The ink set of claim 35, wherein the black colorant is at least one black dye selected from the group consisting of pacified Reactive Black 31 and

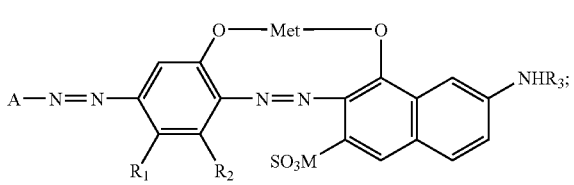

Formula I wherein A is unsubstituted or optionally substituted phenyl or unsubstituted or optionally substituted naphthyl; $R_1$ is hydrogen, alkyl, optionally substituted alkyl, alkoxy, optionally substituted alkoxy, all with 1 to 18 carbon atoms, amino, optionally substituted amino, halo, trifluoromethyl, carboxy, sulpho, carbamido, alkylcarbonylamino, arylcarbonylamino, or forms together with $R_2$ and the phenylene ring a 1,4-naphthylene moiety which can be unsubstituted or substituted in position 6 or 7; $R_3$ is hydrogen, alkyl, optionally substituted alkyl, all with 1 to 18 carbon atoms, cycloalkyl, unsubstituted or optionally substituted heterocyclic alkyl, unsubstituted or optionally substituted aryl, unsubstituted or optionally substituted aralkyl, saturated or unsaturated aza, oxa or thia heterocyclic radicals or mixtures of saturated or unsaturated aza, oxa or thia heterocyclic radicals; M is hydrogen, a metal cation, an ammonium cation or an ammonium cation substituted with alkyl, alkoxyalkyl or hydroxyalkyl radicals each having 1 to 12 carbon atoms and Met is Cu, Ni or Zn;

and wherein the yellow colorant is at least one yellow dye selected from the group consisting of AY23,

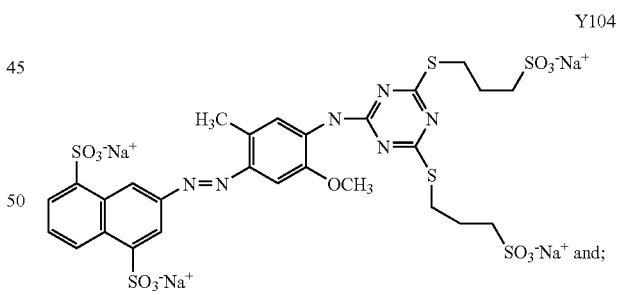

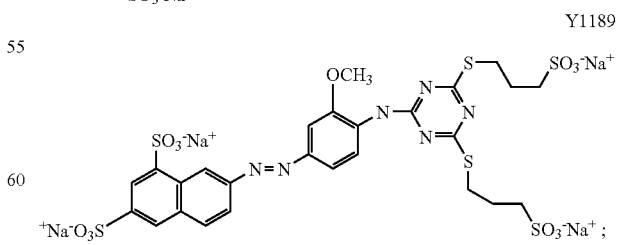

and the light gray ink, medium gray in and dark gray ink further comprises a magenta colorant which as at least one magenta dye selected from the group consisting of

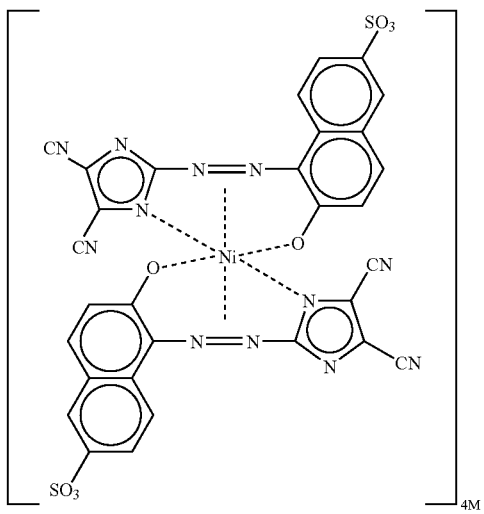

DJR814

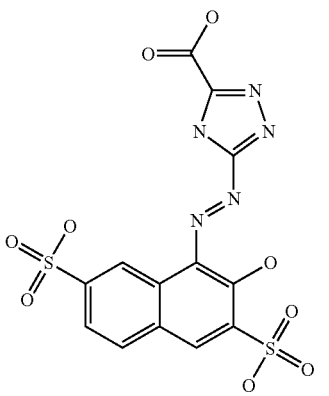

Formula II

2:2 Ni Complex.

40. The ink set of claim 39, wherein the light gray ink, medium gray ink and dark gray ink each further comprises a cyan colorant which is at least one cyan dye selected from the group consisting of

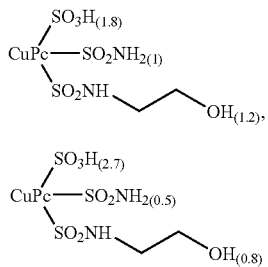

C854

C485 and Direct Blue 199 TMA.

41. The ink set of claim 40, wherein the at least one yellow dye is Y104; the at least one black dye is Formula I; the at least one magenta dye is DJR814; and the at least one cyan dye is selected from the group consisting of DB199TMA and C485;

and wherein the absorbance ratio of yellow dye:black dye:magenta dye:cyan dye for light gray ink is 1.4:1.4:1:1 with each ratio value ranging +/−10%.

42. The ink set of claim 40, wherein the at least one yellow dye is Y104; the at least one black dye is Formula I; the at least one magenta dye is DJR814; and the at least one cyan dye is C854; and wherein the absorbance ratio of yellow dye:black dye:magenta dye:cyan dye for light gray ink is 1.4:1.8:1:1 with each ratio value ranging +/−10%.

43. The ink set of claim 40, wherein the at least one yellow dye is Y1189; the at least one black dye is Formula I; the at least one magenta dye is DJR814; and the at least one cyan dye is C854; and wherein the absorbance ratio of yellow dye:black dye:magenta dye:cyan dye for light gray ink is 1.6:1.8:1:1 with each ratio value ranging +/−10%.

44. The ink set of claim 40, wherein the at least one black dye is Formula I; the at least one yellow dye is AY23; the at least one magenta dye is DJR814; and the at least one cyan dye is C854.

45. The ink set of claim 39, wherein the at least one yellow dye is Y104; the at least one black dye is Formula I; and the at least one magenta dye is DJR814; and wherein the absorbance ratio of yellow dye:black dye:magenta dye for light gray ink is about 2:4.9:1 with each ratio value ranging +/−10%.

46. The ink set of claim 39, wherein the at least one yellow dye is Y104; the at least one black dye is Formula I; and the at least one magenta dye is DJR814; and wherein the absorbance ratio of yellow dye:black dye: is magenta dye for dark gray ink is 2.7:6.5:1 with each ratio value ranging +/−10%.

47. The ink set of claim 39, wherein the at least one black dye is Formula I; the at least one yellow dye is Y104; and the at least one magenta dye is Formula II.

48. The ink set of claim 39, wherein the ink vehicle is a non-reactive ink-vehicle comprising:
water;
from 1% to 3% by weight of 1,5-pentanediol co-solvent;
from 7.5% to 15% by weight of trimethylolpropane co-solvent; and from 5% to 8% by weight of a third co-solvent, with the proviso that the ink vehicle comprise at least 20% by weight of total co-solvents.

49. The ink-set of claim 35, wherein black colorant is at least one black dye selected from the group consisting of pacified Reactive Black 31;

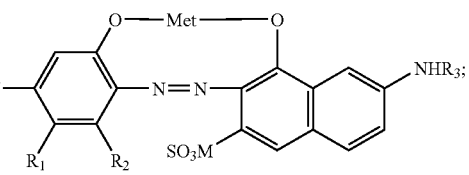

Formula I wherein A is unsubstituted or optionally substituted phenyl or unsubstituted or optionally substituted naphthyl; $R_1$ is hydrogen, alkyl, optionally substituted alkyl, alkoxy, optionally substituted alkoxy, all with 1 to 18 carbon atoms, amino, optionally substituted amino, halo, trifluoromethyl, carboxy, sulpho, carbamido, alkylcarbonylamino, arylcarbonylamino, or forms together with $R_2$ and the phenylene ring a 1,4-naphthylene moiety which can be unsubstituted or substituted in position 6 or 7; R₃ is hydrogen, alkyl, optionally substituted alkyl, all with 1 to 18 carbon atoms, cycloalkyl, unsubstituted or optionally substituted heterocyclic alkyl, unsubstituted or optionally substituted aryl, unsubstituted or optionally substituted aralkyl, saturated or unsaturated aza, oxa or thia heterocyclic radicals or mixtures of saturated or unsaturated aza, oxa or thia heterocyclic radicals; M is hydrogen, a metal cation, an ammonium cation or an ammonium cation substituted with alkyl, alkoxyalkyl or hydroxyalkyl radicals each having 1 to 12 carbon atoms and Met is Cu, Ni or Zn;

and wherein the yellow colorant is at least one yellow dye selected from the group consisting of AY23,

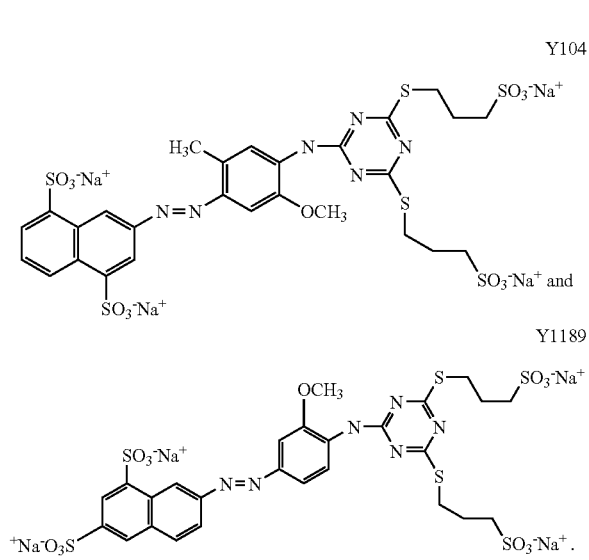

50. The ink set of claim 49, wherein the at least one yellow dye is Y104; and wherein the absorbance ratio of Y104 dye:pacified Reactive Black 31 dye:Formula I dye for light gray ink is 1:6:8 with each ratio value ranging +/−10%.

51. The ink set of claim 49,
wherein the at least one yellow dye is Y104; and wherein the absorbance ratio of Y104 dye:pacified Reactive Black 31 dye:Formula I dye for dark gray ink is 1:4:8 with each ratio value ranging +/−10%.

52. An ink set for ink-jet printing, comprising an eight-ink ink set of cyan ink, magenta ink, yellow ink, light cyan ink, light magenta ink, light gray ink, medium gray ink and dark gray ink (CMYcmgGz); the light gray ink, medium gray ink and dark gray ink each comprising a black colorant and a yellow colorant;
and wherein the light gray ink has a hue range of 250°–310°, a chroma range of less than 6, and an L* range of 60–68; the medium gray ink has a hue range of 250°–310°, a chroma range of less than 6, and an L* range of 35–42; and the dark gray ink has a hue range of 150°–270°, a chroma range of less than 6, and an L* range of 10–18; and when two or three of the light gray, medium gray and dark gray inks are printed together, a gray color results having a hue range of 250°–310° and a chroma range of 2–6.

53. The ink set of claim 52, wherein in the medium gray ink:
the black colorant has a hue range of 250°–270°; and
the yellow colorant has a hue range of 80°–120°.

54. The ink set of claim 53, wherein the medium gray ink further comprises an additional magenta colorant having a hue range of 320°–350°.

55. The ink set of claim 54, wherein the medium gray ink further comprises an additional cyan colorant having a hue is range of 215°–240°.

56. The ink set of claim 52, wherein the black colorant is at least one black dye selected from the group consisting of pacified Reactive Black 31 and

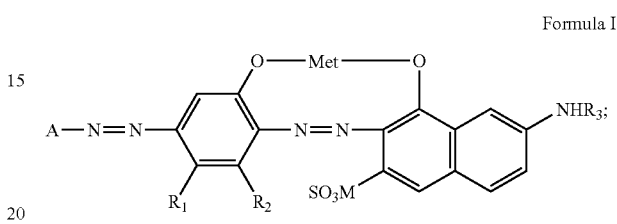

Formula I wherein A is unsubstituted or optionally substituted phenyl or unsubstituted or optionally substituted naphthyl; R₁ is hydrogen, alkyl, optionally substituted alkyl, alkoxy, optionally substituted alkoxy, all with 1 to 18 carbon atoms, amino, optionally substituted amino, halo, trifluoromethyl, carboxy, sulpho, carbamido, alkylcarbonylamino, arylcarbonylamino, or forms together with R₂ and the phenylene ring a 1,4-naphthylene moiety which can be unsubstituted or substituted in position 6 or 7; R₃ is hydrogen, alkyl, optionally substituted alkyl, all with 1 to 18 carbon atoms, cycloalkyl, unsubstituted or optionally substituted heterocyclic alkyl, unsubstituted or optionally substituted aryl, unsubstituted or optionally substituted aralkyl, saturated or unsaturated aza, oxa or thia heterocyclic radicals or mixtures of saturated or unsaturated aza, oxa or thia heterocyclic radicals; M is hydrogen, a metal cation, an ammonium cation or an ammonium cation substituted with alkyl, alkoxyalkyl or hydroxyalkyl radicals each having 1 to 12 carbon atoms and Met is Cu, Ni or Zn;

and wherein the yellow colorant is at least one yellow dye selected from the group consisting of AY23,

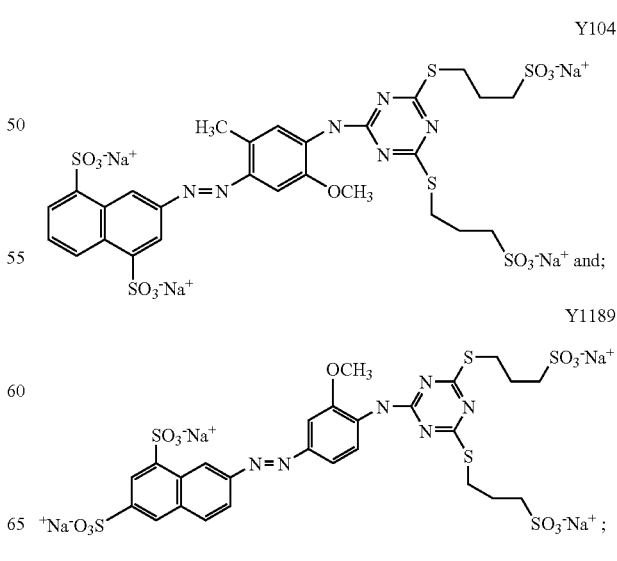

and the light gray ink, medium gray ink and dark gray ink each further comprises a magenta colorant which is at least one magenta dye selected from the group consisting of

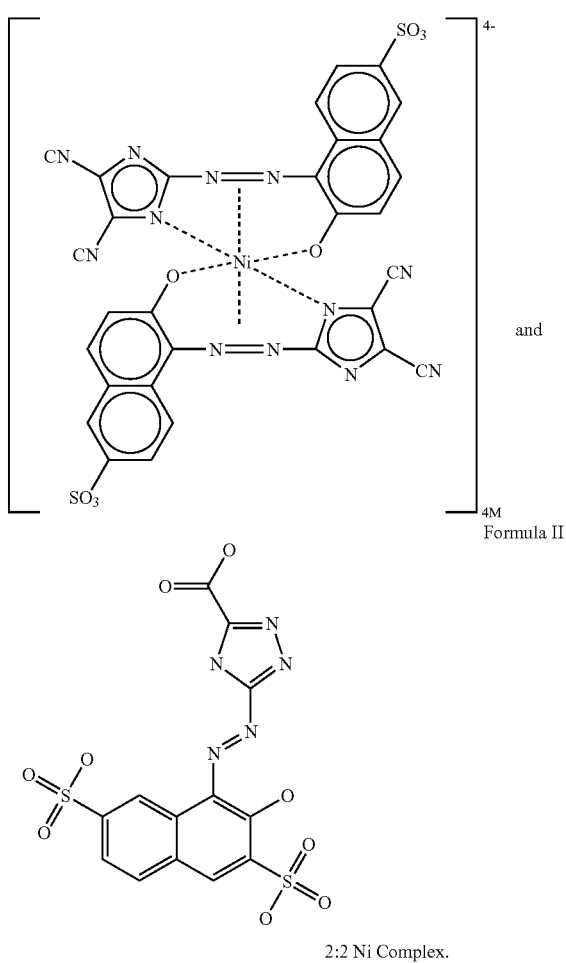

2:2 Ni Complex.

57. The ink set of claim 56, wherein the light gray ink, medium gray ink and dark gray ink further comprises at least one cyan dye selected from the group consisting of

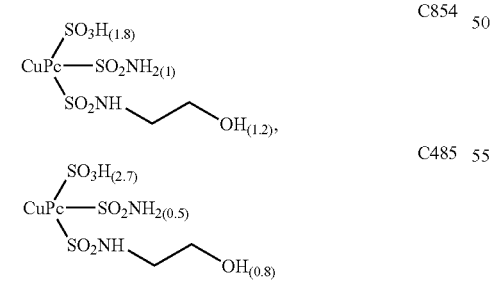

and Direct Blue 199 TMA.

58. The ink set of claim 57, wherein the at least one yellow dye is Y104; the at least one black dye is Formula I; the at least one magenta dye is DJR814; and the at least one cyan dye is selected from the group consisting of DB199TMA and C485;
and wherein the absorbance ratio of yellow dye:black dye:magenta dye:cyan dye for light gray ink is 1.4:1.4:1:1 with each ratio value ranging +/−10%.

59. The ink set of claim 57,
wherein the at least one yellow dye is Y104; the at least one black dye is Formula I; the at least one magenta dye is DJR814; and the at least one cyan dye is C854;
and wherein the absorbance ratio of yellow dye:black dye:magenta dye:cyan dye for light gray ink is 1.4:1.8:1:1 with each ratio value ranging +/−10%.

60. The ink set of claim 57,
wherein the at least one yellow dye is Y1189; the at least one black dye is Formula I; the at least one magenta dye is DJR814; and the at least one cyan dye is C854;
and wherein the absorbance ratio of yellow dye:black dye:magenta dye:cyan dye for light gray ink is 1.6:1.8:1:1 with each ratio value ranging +/−10%.

61. The ink set of claim 57, wherein the at least one black dye is Formula I; the at least one yellow dye is AY23; the at least one magenta dye is DJR814; and the at least one cyan dye is C854.

62. The ink set of claim 56,
wherein the at least one yellow dye is Y104; the at least one black dye is Formula I; and the at least one magenta dye is DJR814; and wherein the absorbance ratio of yellow dye:black dye:magenta dye for light gray ink is about 2:4.9:1 with each ratio value ranging +/−10%.

63. The ink set of claim 56, wherein the at least one yellow dye is Y104; the at least one black dye is Formula I; and the at least one magenta dye is DJR814; and wherein the absorbance ratio of yellow dye:black dye:magenta dye for dark gray ink is 2.7:6.5:1 with each ratio value ranging +/−10%.

64. The ink set of claim 56, wherein the at least one black dye is Formula I; the at least one yellow dye is Y104; and the at least one magenta dye is Formula II.

65. The ink set of claim 56, wherein the ink vehicle is a non-reactive ink-vehicle comprising:
water;
from 1% to 3% by weight of 1,5-pentanediol co-solvent;
from 7.5% to 15% by weight of trimethylolpropane co-solvent; and
from 5% to 8% by weight of a third co-solvent, with the proviso that the ink vehicle comprise at least 20% by weight of total co-solvents.

66. The ink set of claim 52, wherein the black colorant is at least one black dye selected from the group consisting of pacified Reactive Black 31;

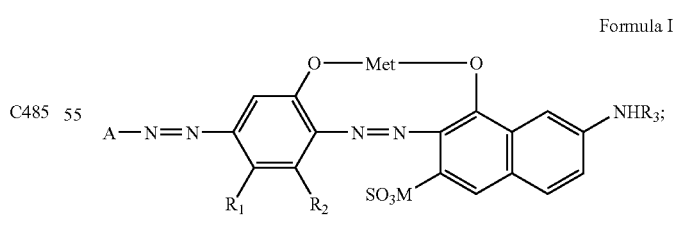

wherein A is unsubstituted or optionally substituted phenyl or unsubstituted or optionally substituted naphthyl; $R_1$ is hydrogen, alkyl, optionally substituted alkyl, alkoxy, optionally substituted alkoxy, all with 1 to 18 carbon atoms, amino, optionally substituted amino, halo, trifluoromethyl, carboxy, sulpho, carbamido, alkylcarbonylamino, arylcarbonylamino, or forms together with $R_2$ and the phenylene ring a 1,4-naphthylene moiety which can be unsubstituted or substituted in position 6 or 7; R₃ is hydrogen, alkyl, optionally substituted alkyl, all with 1 to 18 carbon atoms, cycloalkyl, unsubstituted or optionally substituted heterocyclic alkyl, unsubstituted or optionally substituted aryl, unsubstituted or optionally substituted aralkyl, saturated or unsaturated aza, oxa or thia heterocyclic radicals or mixtures of saturated or unsaturated aza, oxa or thia heterocyclic radicals; M is hydrogen, a metal cation, an ammonium cation or an ammonium cation substituted with alkyl, alkoxyalkyl or hydroxyalkyl radicals each having 1 to 12 carbon atoms and Met is Cu, Ni or Zn;

and wherein the yellow colorant is at least one yellow dye selected from the group consisting of AY23,

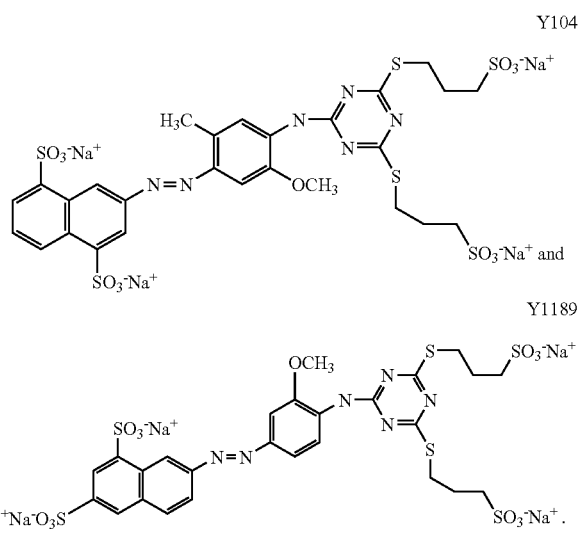

67. The ink set of claim 66, wherein the at least one yellow dye is Y104; and wherein the absorbance ratio of Y104 dye:pacified Reactive Black 31 dye:Formula I dye for light gray ink is 1:6:8 with each ratio value ranging +/−10%.

68. The ink set of claim 66, wherein the at least one yellow dye is Y104; and wherein the absorbance ratio of Y104 dye:pacified Reactive Black 31 dye:Formula I dye for dark gray ink is 1:4:8 with each ratio value ranging +/−10%.

69. A method of printing gray and neutral areas with increased definition and decreased hue shift in 3-ink ink-jet printing comprising:

printing on a medium with a three-ink ink set of light gray ink, medium gray ink, and dark gray ink (gGz); the light gray ink, medium gray ink and dark gray ink each comprising a black colorant and a yellow colorant;

and wherein the light gray ink has a hue range of 250°–310°, a chroma range of less than 6, and an L* range of 54–72; the medium gray ink has a hue range of 250°–310°, a chroma range of less than 6, and an L* range of 30–47; and the dark gray ink has a hue range of 150°–270°, a chroma range of less than 6, and an L* range of 10–18; and when two or three of the light gray, medium gray and dark gray inks are printed together, a gray color results having a hue range of 250°–310° and a chroma range of 2–6.

70. The method of claim 69, wherein in the medium gray ink:
   the black colorant has a hue range of 250°–270°; and
   the yellow colorant has a hue range of 80°–120°.

71. The method of claim 70, wherein the medium gray ink further comprises an additional magenta colorant having a hue range of 320°–350°.

72. The method of claim 71, wherein the medium gray ink further comprises an additional cyan colorant having a hue range of 215°–240°.

73. The method of claim 69, wherein the black colorant is at least one black dye selected from the group consisting of pacified Reactive Black 31 and

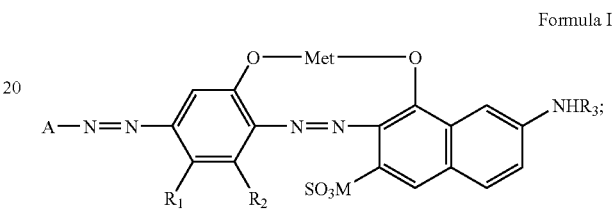

Formula I wherein A is unsubstituted or optionally substituted phenyl or unsubstituted or optionally substituted naphthyl; R₁ is hydrogen, alkyl, optionally substituted alkyl, alkoxy, optionally substituted alkoxy, all with 1 to 18 carbon atoms, amino, optionally substituted amino, halo, trifluoromethyl, carboxy, sulpho, carbamido, alkylcarbonylamino, arylcarbonylamino, or forms together with R₂ and the phenylene ring a 1,4-naphthylene moiety which can be unsubstituted or substituted in position 6 or 7; R₃ is hydrogen, alkyl, optionally substituted alkyl, all with 1 to 18 carbon atoms, cycloalkyl, unsubstituted or optionally substituted heterocyclic alkyl, unsubstituted or optionally substituted aryl, unsubstituted or optionally substituted aralkyl, saturated or unsaturated aza, oxa or thia heterocyclic radicals or mixtures of saturated or unsaturated aza, oxa or thia heterocyclic radicals; M is hydrogen, a metal cation, an ammonium cation or an ammonium cation substituted with alkyl, alkoxyalkyl or hydroxyalkyl radicals each having 1 to 12 carbon atoms and Met is Cu, Ni or Zn;

and wherein the yellow colorant is at least one yellow dye selected from the group consisting of AY23,

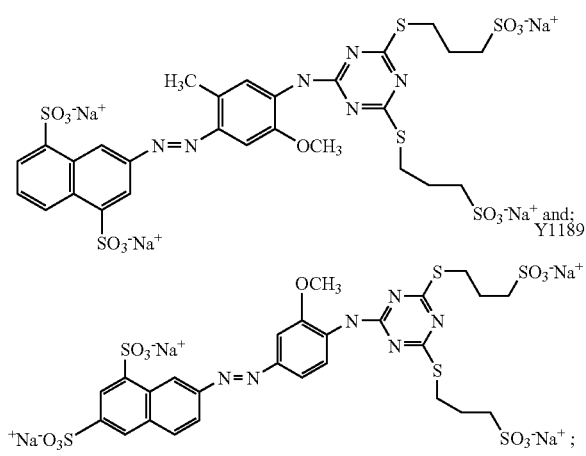

and the light gray ink, medium gray ink and dark gray ink each further comprises a magenta colorant which is at least one magenta dye selected from the group consisting of

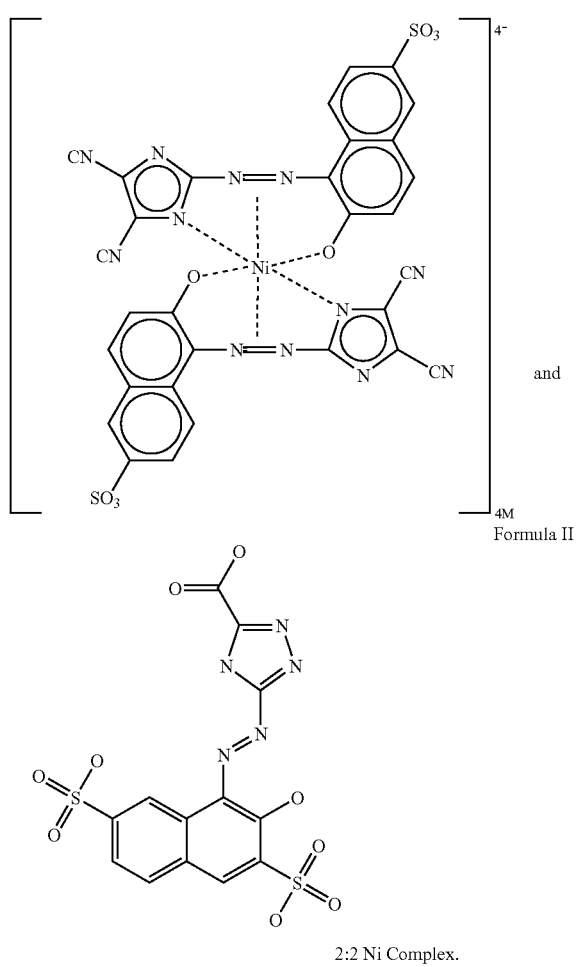

DJR814

Formula II

2:2 Ni Complex.

74. The method of claim 73, wherein the light gray ink, medium gray ink and dark gray ink each further comprises a cyan colorant which is at least one cyan dye selected from the group consisting of

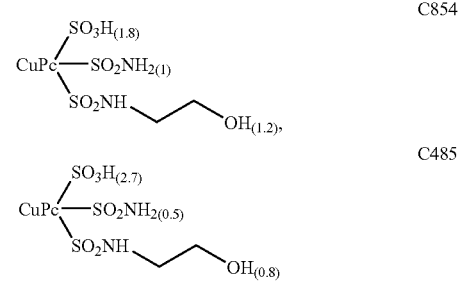

C854

C485 and Direct Blue 199 TMA.

75. The method of claim 74, wherein the at least one yellow dye is Y104; the at least one black dye is Formula I; the at least one magenta dye is DJR814; and the at least one cyan dye is selected from the group consisting of DB199TMA and C485;

and wherein the absorbance ratio of yellow dye:black dye:magenta dye:cyan dye for light gray ink is 1.4:1.4:1:1 with each ratio value ranging +/−10%.

76. The method of claim 74, wherein the at least one yellow dye is Y104; the at least one black dye is Formula I; the at least one magenta dye is DJR814; and the at least one cyan dye is C854;

and wherein the absorbance ratio of yellow dye:black dye:magenta dye:cyan dye for light gray ink is 1.4:1.8:1:1 with each ratio value ranging +/−10%.

77. The method of claim 74, wherein the at least one yellow dye is Y1189; the at least one black dye is Formula I; the at least one magenta dye is DJR814; and the at least one cyan dye is C854;

and wherein the absorbance ratio of yellow dye:black dye:magenta dye:cyan dye for light gray ink is 1.6:1.8:1:1 with each ratio value ranging +/−10%.

78. The method of claim 74, wherein the at least one black dye is Formula I; the at least one yellow dye is AY23; the at least one magenta dye is DJR814; and the at least one cyan dye is C854.

79. The method of claim 73, wherein the at least one yellow dye is Y104; the at least one black dye is Formula I; and the at least one magenta dye is DJR814; and wherein the absorbance ratio of yellow dye:black dye:magenta dye for light gray ink is about 2:4.9:1 with each ratio value ranging +/−10%.

80. The method of claim 73, wherein the at least one yellow dye is Y104; the at least one black dye is Formula I; and the at least one magenta dye is DJR814; and wherein the absorbance ratio of yellow dye:black dye:magenta dye for dark gray ink is 2.7:6.5:1 with each ratio value ranging +/−10%.

81. The method of claim 73, wherein the at least one black dye is Formula I; the at least one yellow dye is Y104; and the at least one magenta dye is Formula II.

82. The method of claim 73, wherein the ink vehicle is a non-reactive ink-vehicle comprising:
water;
from 1% to 3% by weight of 1,5-pentanediol co-solvent;
from 7.5% to 15% by weight of trimethylolpropane co-solvent; and
from 5% to 8% by weight of a third co-solvent, with the proviso that the ink vehicle comprise at least 20% by weight of total co-solvents.

83. The method according to 69, wherein the black colorant is at least one black dye selected from the group consisting of pacified Reactive Black 31;

Formula I

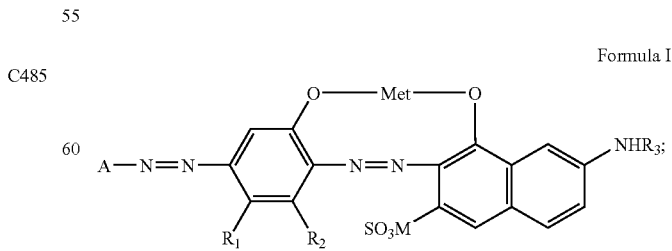

wherein A is unsubstituted or optionally substituted phenyl or unsubstituted or optionally substituted naphthyl; $R_1$ is hydrogen, alkyl, optionally substituted alkyl, alkoxy, optionally substituted alkoxy, all with 1 to 18 carbon atoms, amino, optionally substituted amino, halo, trifluoromethyl, carboxy, sulpho, carbamido, alkylcarbonylamino, arylcarbonylamino, or forms together with $R_2$ and the phenylene ring a 1,4-naphthylene moiety which can be unsubstituted or substituted in position 6 or 7; $R_3$ is hydrogen, alkyl, optionally substituted alkyl, all with 1 to 18 carbon atoms, cycloalkyl, unsubstituted or optionally substituted heterocyclic alkyl, unsubstituted or optionally substituted aryl, unsubstituted or optionally substituted aralkyl, saturated or unsaturated aza, oxa or thia heterocyclic radicals or mixtures of saturated or unsaturated aza, oxa or thia heterocyclic radicals; M is hydrogen, a metal cation, an ammonium cation or an ammonium cation substituted with alkyl, alkoxyalkyl or hydroxyalkyl radicals each having 1 to 12 carbon atoms and Met is Cu, Ni or Zn;

and wherein the yellow colorant is at least one yellow dye selected from the group consisting of AY23, 86. A method of printing gray and neutral areas with increased definition and decreased hue shift in 6-ink ink-jet printing comprising:
   printing on a medium with a six-ink ink set of cyan ink, magenta ink, yellow ink, light gray ink, medium gray ink, and dark gray ink (CMYgGz); the light gray ink, the medium gray ink and the dark gray ink each comprising a black colorant and a yellow colorant;
   and wherein the light gray ink has a hue range of 250°–310°, a chroma range of less than 6, and an L* range of 60–68; the medium gray ink has a hue range of 250°–310°, a chroma range of less than 6, and an L* range of 35–42; and the dark gray ink has a hue range of 150°–270°, a chroma range of less than 6, and an L* range of 10–18; and when two or three of the light gray, medium gray and dark gray inks are printed together, a gray color results having a hue range of 250°–310° and a chroma range of 2–6.

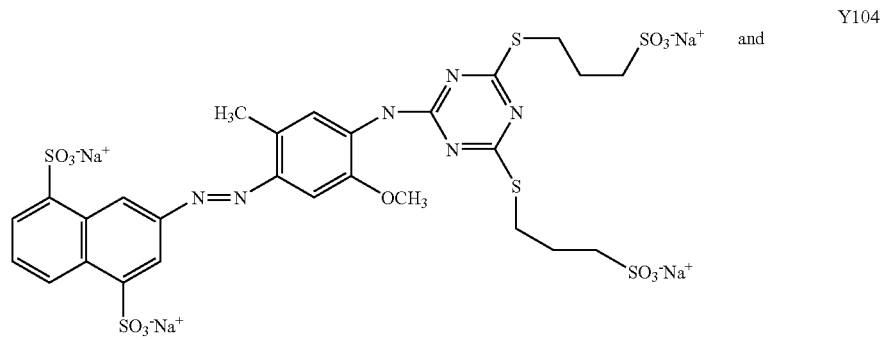

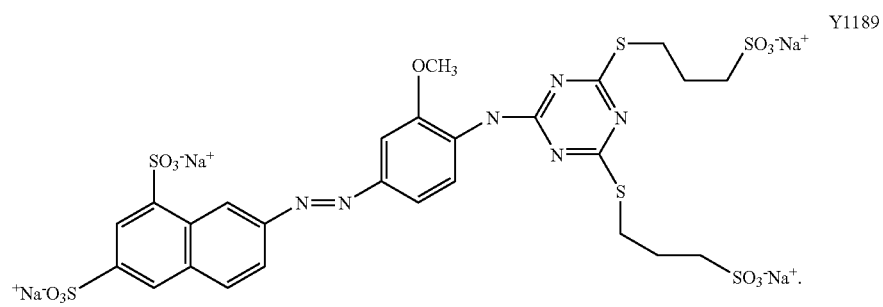

84. The method of claim 83, wherein the at least one yellow dye is Y104; and wherein the absorbance ratio of Y104 dye:pacified Reactive Black 31 dye:Formula I dye for light gray ink is 1:6:8 with each ratio value ranging +/−10%.

85. The method of claim 83,
   wherein the at least one yellow dye is Y104; and wherein the absorbance ratio of Y104 dye:pacified Reactive Black 31 dye:Formula I dye for dark gray ink is 1:4:8 with each ratio value ranging +/−10%.

87. The method of claim 86, wherein in the medium gray ink:
   the black colorant has a hue range of 250°–270°; and
   yellow colorant has a hue range of 80°–120°.

88. The method of claim 87, wherein the medium gray ink further comprises an additional magenta colorant having a hue range of 320°–350°.

89. The method of claim 88, wherein the medium gray ink further comprises an additional cyan colorant having a hue range of 215°–240°.

90. The method of claim 86, wherein the black colorant is at least one black dye selected from the group consisting of pacified Reactive Black 31 and

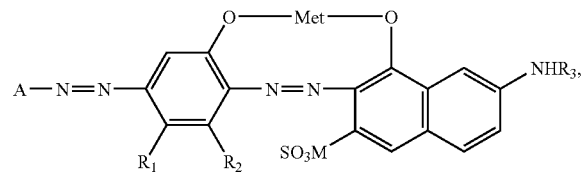

Formula I wherein A is unsubstituted or optionally substituted phenyl or unsubstituted or optionally substituted naphthyl; $R_1$ is hydrogen, alkyl, optionally substituted alkyl, alkoxy, optionally substituted alkoxy, all with 1 to 18 carbon atoms, amino, optionally substituted amino, halo, trifluoromethyl, carboxy, sulpho, carbamido, alkylcarbonylamino, arylcarbonylamino, or forms together with $R_2$ and the phenylene ring a 1,4-naphthylene moiety which can be unsubstituted or substituted in position 6 or 7; $R_3$ is hydrogen, alkyl, optionally substituted alkyl, all with 1 to 18 carbon atoms, cycloalkyl, unsubstituted or optionally substituted heterocyclic alkyl, unsubstituted or optionally substituted aryl, unsubstituted or optionally substituted aralkyl, saturated or unsaturated aza, oxa or thia heterocyclic radicals or mixtures of saturated or unsaturated aza, oxa or thia heterocyclic radicals; M is hydrogen, a metal cation, an ammonium cation or an ammonium cation substituted with alkyl, alkoxyalkyl or hydroxyalkyl radicals each having 1 to 12 carbon atoms and Met is Cu, Ni or Zn;

and wherein the yellow colorant is at least one yellow dye selected from the group consisting of AY23, and the light gray ink, medium ink and dark gray ink further comprises a magenta colorant which is at least one magenta dye selected from the group consisting of

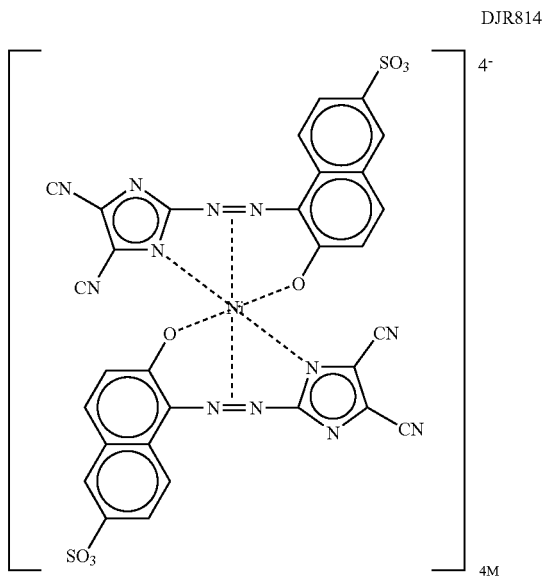

DJR814

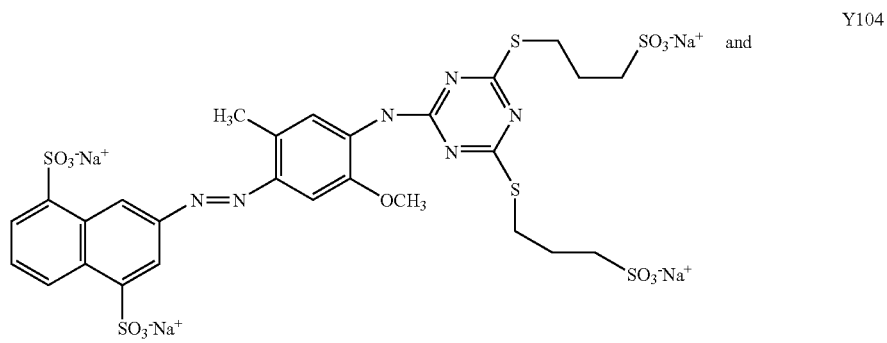

Y104 and

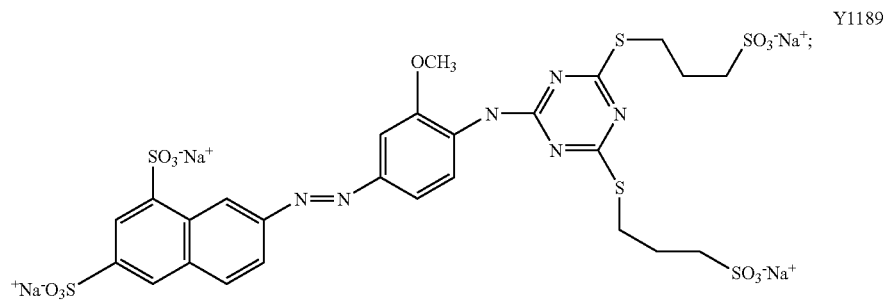

Y1189

-continued

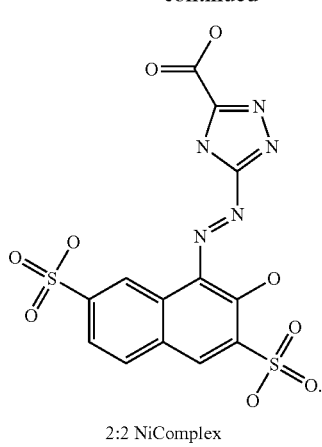

Formula II

2:2 NiComplex

91. The method of claim 90, wherein the light gray ink, medium gray ink and dark gray ink each further comprises at least one cyan dye selected from the group consisting of

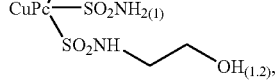

C854

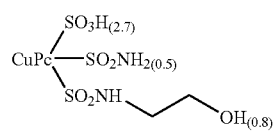

C485 and Direct Blue 199 TMA.

92. The method of claim 91, wherein the at least one yellow dye is Y104; the at least one black dye is Formula I; the at least one magenta dye is DJR814; and the at least one cyan dye is selected from the group consisting of DB199TMA and C485;

and wherein the absorbance ratio of yellow dye:black dye:magenta dye:cyan dye for light gray ink is 1.4:1.4:1:1 with each ratio value ranging +/−10%.

93. The method of claim 91, wherein the at least one yellow dye is Y104; the at least one black dye is Formula I; the at least one magenta dye is DJR814; and the at least one cyan dye is C854;

and wherein the absorbance ratio of yellow dye:black dye:magenta dye:cyan dye for light gray ink is 1.4:1.8:1:1 with each ratio value ranging +/−10%.

94. The method of claim 91, wherein the at least one yellow dye is Y1189; the at least one black dye is Formula I; the at least one magenta dye is DJR814; and the at least one cyan dye is C854;

and wherein the absorbance ratio of yellow dye:black dye:magenta dye:cyan dye for light gray ink is 1.6:1.8:1:1 with each ratio value ranging +/−10%.

95. The method of claim 91, wherein the at least one black dye is Formula I; the at least one yellow dye is AY23; the at least one magenta dye is DJR814; and the at least one cyan dye is C854.

96. The method of claim 90, wherein the at least one yellow dye is Y104; the at least one black dye is Formula I; and the at least one magenta dye is DJR814; and wherein the absorbance ratio of yellow dye:black dye:magenta dye for light gray ink is about 2:4.9:1 with each ratio value ranging +/−10%.

97. The method of claim 90, wherein the at least one yellow dye is Y104; the at least one black dye is Formula I; and the at least one magenta dye is DJR814; and wherein the absorbance ratio of yellow dye:black dye:magenta dye for dark gray ink is 2.7:6.5:1 with each ratio value ranging +/−10%.

98. The method of claim 90, wherein the at least one black dye is Formula I; the at least one yellow dye is Y104; and the at least one magenta dye is Formula II.

99. The method of claim 90, wherein the ink vehicle is a non-reactive ink-vehicle comprising:

water;

from 1% to 3% by weight of 1,5-pentanediol co-solvent;

from 7.5% to 15% by weight of trimethylolpropane co-solvent; and from 5% to 8% by weight of a third co-solvent, with the proviso that the ink vehicle comprise at least 20% by weight of total co-solvents.

100. The method of claim 86, wherein the black colorant is at least one black dye selected from the group consisting of

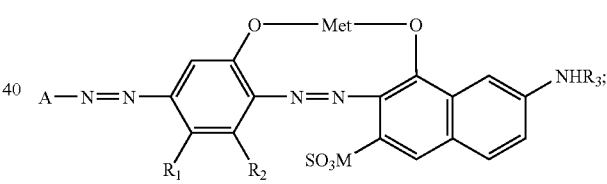

Formula I wherein A is unsubstituted or optionally substituted phenyl or unsubstituted or optionally substituted naphthyl; $R_1$ is hydrogen, alkyl, optionally substituted alkyl, alkoxy, optionally substituted alkoxy, all with 1 to 18 carbon atoms, amino, optionally substituted amino, halo, trifluoromethyl, carboxy, sulpho, carbamido, alkylcarbonylamino, arylcarbonylamino, or forms together with $R_2$ and the phenylene ring a 1,4-naphthylene moiety which can be unsubstituted or substituted in position 6 or 7; $R_3$ is hydrogen, alkyl, optionally substituted alkyl, all with 1 to 18 carbon atoms, cycloalkyl, unsubstituted or optionally substituted heterocyclic alkyl, unsubstituted or optionally substituted aryl, unsubstituted or optionally substituted aralkyl, saturated or unsaturated aza, oxa or thia heterocyclic radicals or mixtures of saturated or unsaturated aza, oxa or thia heterocyclic radicals; M is hydrogen, a metal cation, an ammonium cation or an ammonium cation substituted with alkyl, alkoxyalkyl or hydroxyalkyl radicals each having 1 to 12 carbon atoms and Met is Cu, Ni or Zn;

pacified Reactive Black 31 and wherein the yellow colorant is at least one yellow dye selected from the group consisting of AY23,

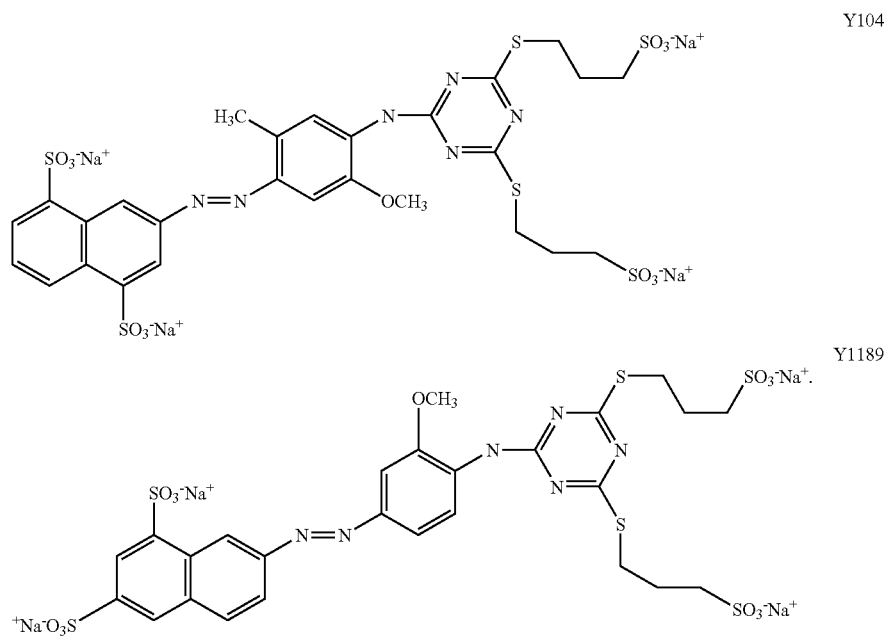

Y104

Y1189

101. The method of claim 100,
wherein the at least one yellow dye is Y104; and wherein the absorbance ratio of Y104 dye:pacified Reactive Black 31 dye:Formula I dye for light gray ink is 1:6:8 with each ratio value ranging +/−10%.

102. The method of claim 100,
wherein the at least one yellow dye is Y104; and wherein the absorbance ratio of Y104 dye:pacified Reactive Black 31 dye:Formula I dye for dark gray ink is 1:4:8 with each ratio value ranging +/−10%.

103. A method of printing gray and neutral areas with increased definition and decreased hue shift in 8-ink ink-jet printing comprising:
printing on a medium with a eight-ink ink set of cyan ink, magenta ink, yellow ink, light cyan ink, light magenta ink, light gray ink, medium gray ink, and dark gray ink (CMYcmgGz); the light gray ink, medium gray ink and dark gray ink each comprising a black colorant and a yellow colorant;
and wherein the light gray ink has a hue range of 250°–310°, a chroma range of less than 6, and an L* range of 54–72; the medium gray ink has a hue range of 250°–310°, a chroma range of less than 6, and an L* range of 30–47; and the dark gray ink has a hue range of 150°–270°, a chroma range of less than 6, and an L* range of 10–18; and when two or three of the light gray, medium gray and dark gray inks are printed together, a gray color results having a hue range of 250°–310° and a chroma range of 2–6.

104. The method of claim 103, wherein in the medium gray ink:
the black colorant has a hue range of 250°–270°; and
the yellow colorant has a hue range of 80°–120°.

105. The method of claim 104, wherein the medium gray ink further comprises an additional magenta colorant having a hue range of 320°–350°.

106. The method of claim 105, wherein the medium gray ink further comprises an additional cyan colorant having a hue range of 215°–240°.

107. The method of claim 103, wherein the black colorant is at least one black dye selected from the group consisting of pacified Reactive Black 31,

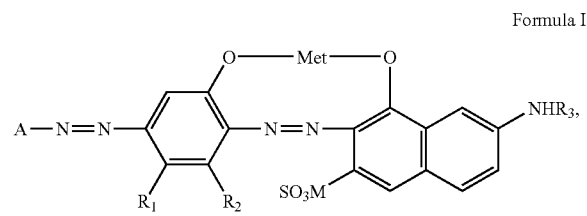

Formula I wherein A is unsubstituted or optionally substituted phenyl or unsubstituted or optionally substituted naphthyl; $R_1$ is hydrogen, alkyl, optionally substituted alkyl, alkoxy, optionally substituted alkoxy, all with 1 to 18 carbon atoms, amino, optionally substituted amino, halo, trifluoromethyl, carboxy, sulpho, carbamido, alkylcarbonylamino, arylcarbonylamino, or forms together with $R_2$ and the phenylene ring a 1,4-naphthylene moiety which can be unsubstituted or substituted in position 6 or 7; $R_3$ is hydrogen, alkyl, optionally substituted alkyl, all with 1 to 18 carbon atoms, cycloalkyl, unsubstituted or optionally substituted heterocyclic alkyl, unsubstituted or optionally substituted aryl, unsubstituted or optionally substituted aralkyl, saturated or unsaturated aza, oxa or thia heterocyclic radicals or mixtures of saturated or unsaturated aza, oxa or thia heterocyclic radicals; M is hydrogen, a metal cation, an ammonium cation or an ammonium cation substituted with alkyl, alkoxyalkyl or hydroxyalkyl radicals each having 1 to 12 carbon atoms and Met is Cu, Ni or Zn;

and Direct Black 19 TMA; and wherein the yellow colorant is at least one yellow dye selected from the group consisting of AY23,

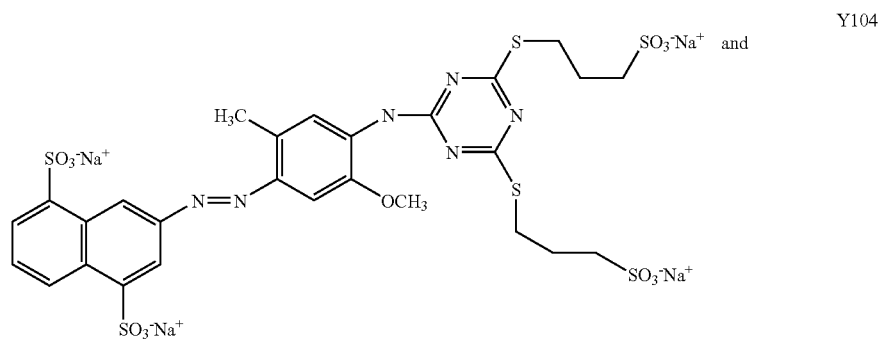
Y104
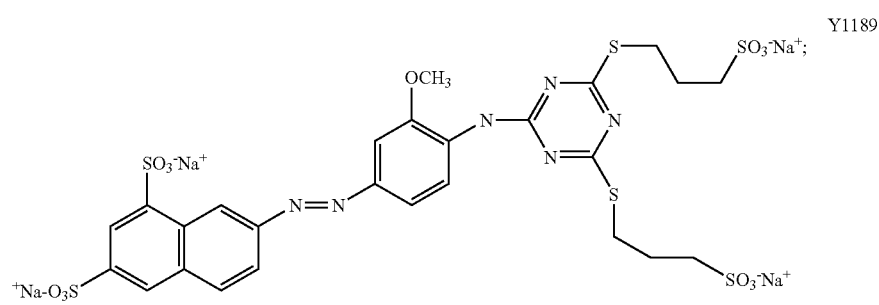
Y1189
and at least one magenta dye selected from the group consisting of
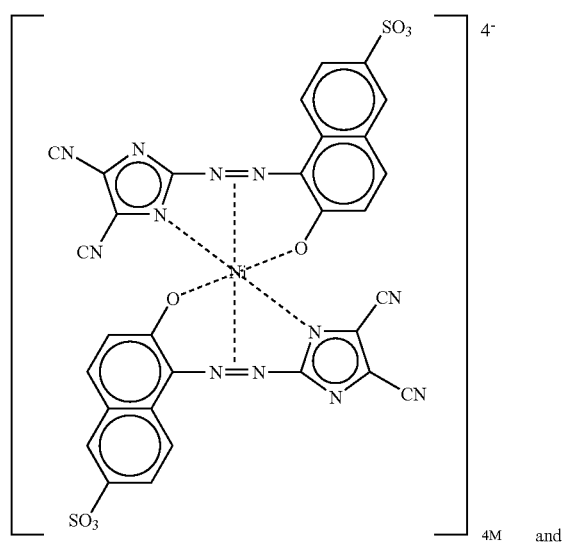
DJR814
-continued
Formula II
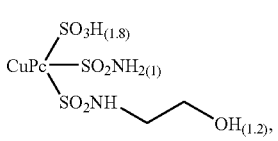
2:2 NiComplex
108. The method of claim 107, wherein the light gray ink, medium gray ink and dark gray ink each further comprises a cyan colorant which is at least one cyan dye selected from the group consisting of
C854
$CuPc \begin{array}{l} -SO_3H_{(1.8)} \\ -SO_2NH_{2(1)} \\ -SO_2NH\phantom{xxxx}OH_{(1.2)}, \end{array}$ -continued

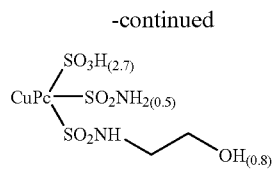
C485 and Direct Blue 199 TMA.

109. The method of claim 108,
wherein the at least one yellow dye is Y104; the at least one black dye is Formula I; the at least one magenta dye is DJR814; and the at least one cyan dye is selected from the group consisting of DB199TMA and C485; and wherein the absorbance ratio of yellow dye:black dye:magenta dye:cyan dye for light gray ink is 1.4:1.4:1:1 with each ratio value ranging +/−10%.

110. The method of claim 108,
wherein the at least one yellow dye is Y104; the at least one black dye is Formula I; the at least one magenta dye is DJR814; and the at least one cyan dye is C854; and wherein the absorbance ratio of yellow dye:black dye:magenta dye:cyan dye for light gray ink is 1.4:1.8:1:1 with each ratio value ranging +/−10%.

111. The method of claim 108,
wherein the at least one yellow dye is Y1189; the at least one black dye is Formula I; the at least one magenta dye is DJR814; and the at least one cyan dye is C854; and wherein the absorbance ratio of yellow dye:black dye:magenta dye:cyan dye for light gray ink is 1.6:1.8:1:1 with each ratio value ranging +/−10%.

112. The method of claim 108, wherein the at least one black dye is Formula I; the at least one yellow dye is AY23; the at least one magenta dye is DJR814; and the at least one cyan dye is C854.

113. The method of claim 107,
wherein the at least one yellow dye is Y104; the at least one black dye is Formula I; and the at least one magenta dye is DJR814; and wherein the absorbance ratio of yellow dye:black dye:magenta dye for light gray ink is about 2:4.9:1 with each ratio value ranging +/−10%.

114. The method of claim 107, wherein the at least one yellow dye is Y104; the at least one black dye is Formula I; and the at least one magenta dye is DJR814; and wherein the absorbance ratio of yellow dye:black dye:magenta dye for dark gray ink is 2.7:6.5:1 with each ratio value ranging +/−10%.

115. The method of claim 107, wherein the at least one black dye is Formula I; the at least one yellow dye is Y104; and the at least one magenta dye is Formula II.

116. The method of claim 107, wherein the ink vehicle is a non-reactive ink-vehicle comprising:
from 1% to 3% by weight of 1,5-pentanediol co-solvent;
from 7.5% to 15% by weight of trimethylolpropane co-solvent; and
from 5% to 8% by weight of a third co-solvent, with the proviso that the ink vehicle comprise at least 20% by weight of total co-solvents.

117. The method of claim 103, wherein the black colorant is at least one black dye selected from the group consisting of:
pacified Reactive Black 31;

Formula I

A—N=N—[benzene with $R_1$, $R_2$]—N=N—[naphthalene with $SO_3M$, $NHR_3$]—O—Met—O wherein A is unsubstituted or optionally substituted phenyl or unsubstituted or optionally substituted naphthyl; $R_1$ is hydrogen, alkyl, optionally substituted alkyl, alkoxy, optionally substituted alkoxy, all with 1 to 18 carbon atoms, amino, optionally substituted amino, halo, trifluoromethyl, carboxy, sulpho, carbamido, alkylcarbonylamino, arylcarbonylamino, or forms together with $R_2$ and the phenylene ring a 1,4-naphthylene moiety which can be unsubstituted or substituted in position 6 or 7; $R_3$ is hydrogen, alkyl, optionally substituted alkyl, all with 1 to 18 carbon atoms, cycloalkyl, unsubstituted or optionally substituted heterocyclic alkyl, unsubstituted or optionally substituted aryl, unsubstituted or optionally substituted aralkyl, saturated or unsaturated aza, oxa or thia heterocyclic radicals or mixtures of saturated or unsaturated aza, oxa or thia heterocyclic radicals; M is hydrogen, a metal cation, an ammonium cation or an ammonium cation substituted with alkyl, alkoxyalkyl or hydroxyalkyl radicals each having 1 to 12 carbon atoms and Met is Cu, Ni or Zn;

and wherein the yellow colorant is at least one yellow dye selected from the group consisting of AY23,

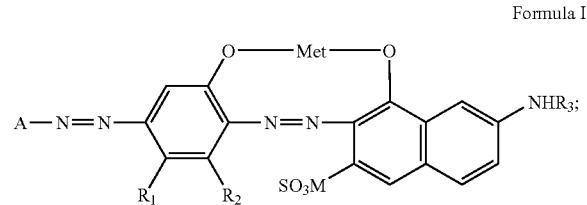
Y104

-continued

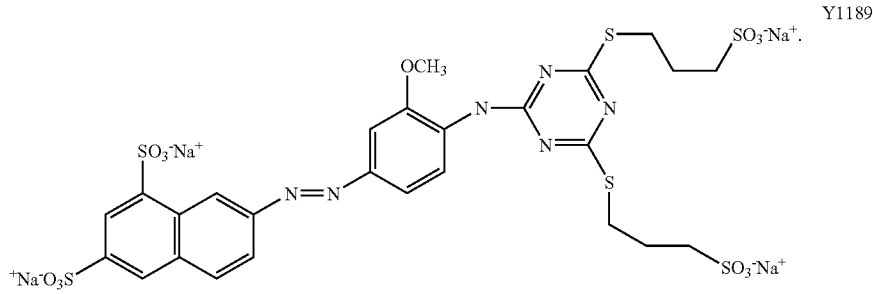
Y1189

118. The method of claim 117, wherein the at least one yellow dye is Y104; and wherein the absorbance ratio of Y104 dye:pacified Reactive Black 31 dye:Formula I dye for light gray ink is 1:6:8 with each ratio value ranging +/−10%.

119. The method of claim 117,
wherein the at least one yellow dye is Y104; and wherein the absorbance ratio of Y104 dye:pacified Reactive Black 31 dye:Formula I dye for dark gray ink is 1:4:8 with each ratio value ranging +/−10%.

* * * * *

UNITED STATES PATENT AND TRADEMARK OFFICE
CERTIFICATE OF CORRECTION

PATENT NO. : 7,033,423 B2  Page 1 of 1
APPLICATION NO. : 10/428298
DATED : April 25, 2006
INVENTOR(S) : Rolly It is certified that error appears in the above-identified patent and that said Letters Patent is hereby corrected as shown below:

In the Claims

Col. 12 (line 28), delete "ink set" and insert therefor --ink--.

Col. 24 (line 65), delete "in" and insert therefor --ink--.

Col. 24 (line 66), delete "as" and insert therefor --is--.

Col. 26 (line 32), delete "yellow dye:black dye: is magenta dye" and insert therefor --yellow dye:black dye:magenta dye--.

Col. 36 (line 61), before "yellow", insert --the--.

Signed and Sealed this

Twenty-seventh Day of March, 2007

JON W. DUDAS
*Director of the United States Patent and Trademark Office*